United States Patent [19]

Evers et al.

[11] 3,988,510

[45] Oct. 26, 1976

[54] 3-FURYL SULFIDES AND FOODSTUFF FLAVOR COMPOSITIONS COMPRISING SAME

[75] Inventors: William J. Evers, Middletown; Howard H. Heinsohn, Jr., Hazlet; Manfred Hugo Vock, Locust; Christopher Giacino, Califon, all of N.J.

[73] Assignee: International Flavors & Fragrances Inc., New York, N.Y.

[22] Filed: May 29, 1975

[21] Appl. No.: 581,962

[52] U.S. Cl. .................. 426/535; 260/250 B; 260/347.2
[51] Int. Cl.$^2$ .................................. A23L 1/231
[58] Field of Search .......... 426/535; 260/250 B, 260/347.2

[56] References Cited
UNITED STATES PATENTS

| | | | |
|---|---|---|---|
| 3,666,495 | 5/1972 | Evers et al. | 426/535 |
| 3,872,111 | 3/1975 | Evers et al. | 260/347.2 |
| 3,873,731 | 3/1975 | Evers et al. | 426/535 |
| 3,891,710 | 6/1975 | Evers et al. | 260/347.2 |
| 3,910,966 | 10/1975 | Evers et al. | 260/347.2 |
| 3,917,869 | 11/1975 | Evers et al. | 426/535 |

*Primary Examiner*—Joseph M. Golian
*Attorney, Agent, or Firm*—Arthur L. Liberman; Harold Haidt

[57] ABSTRACT

Novel 3-furyl sulfides having the formula:

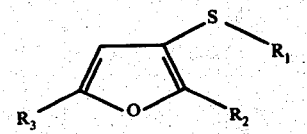

wherein $R_1$ is selected from the group consisting of aralkyl, nitrogenheterocyclic, alkenyl and alkylthioalkyl; and $R_2$ and $R_3$ are each selected from the group consisting of hydrogen and methyl; at least one of $R_2$ and $R_3$ being methyl, such 3-furyl sulfides being useful in modifying or enhancing the organoleptic properties of foodstuffs (e.g. taste and/or aroma).

9 Claims, 18 Drawing Figures

FIG. I

NMR SPECTRUM FOR THE PRODUCT OF EXAMPLE I

IR SPECTRUM FOR THE PRODUCT OF EXAMPLE I

NMR SPECTRUM FOR THE PRODUCT OF EXAMPLE III

NMR SPECTRUM FOR THE PRODUCT OF EXAMPLE VII

IR SPECTRUM FOR THE PRODUCT OF EXAMPLE VII

IR SPECTRUM FOR THE PRODUCT OF EXAMPLE IX

IR SPECTRUM FOR THE PRODUCT OF EXAMPLE XI

FIG.13 NMR SPECTRUM FOR THE PRODUCT OF EXAMPLE XIII

IR SPECTRUM FOR THE PRODUCT OF EXAMPLE XIII

IR SPECTRUM FOR THE PRODUCT OF EXAMPLE XVI

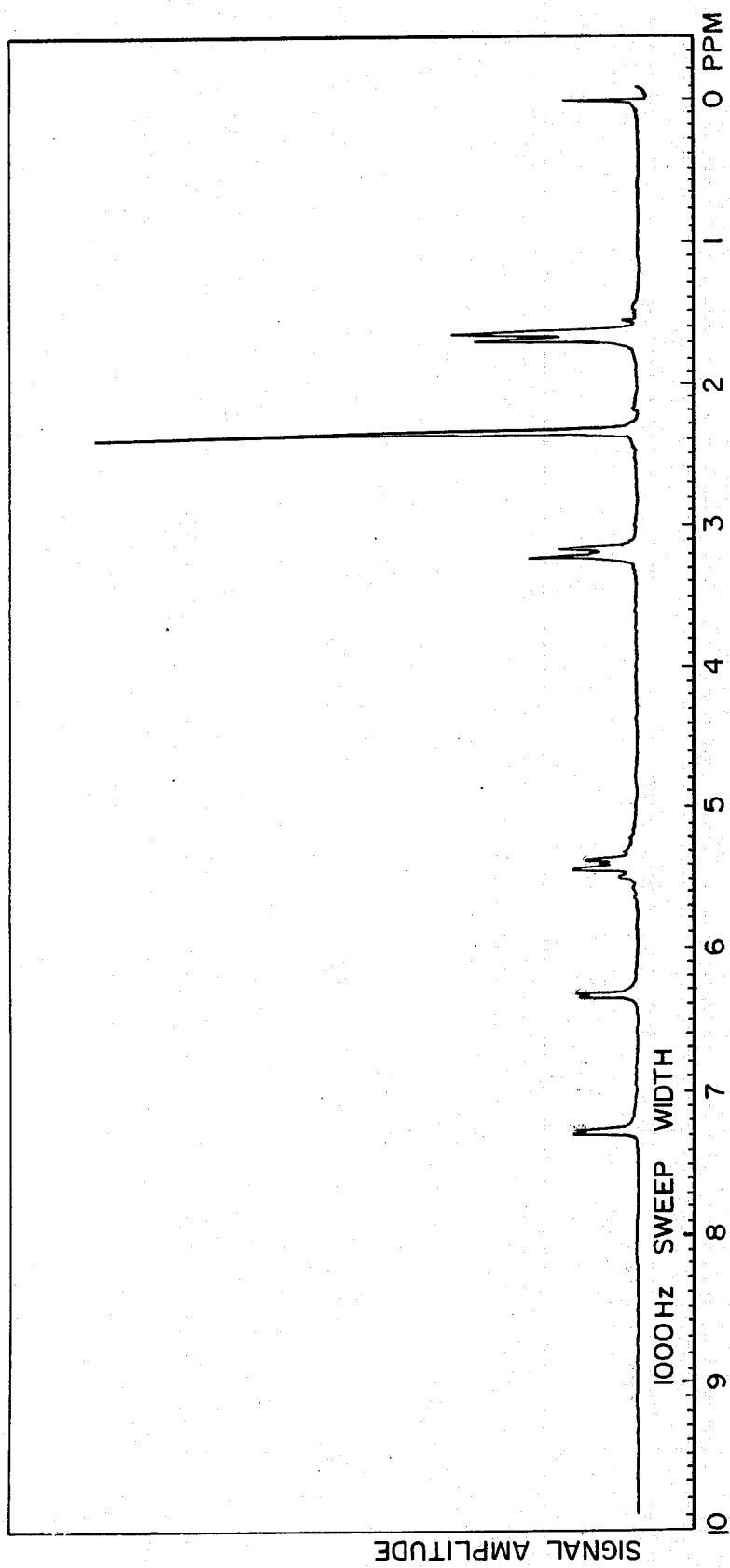

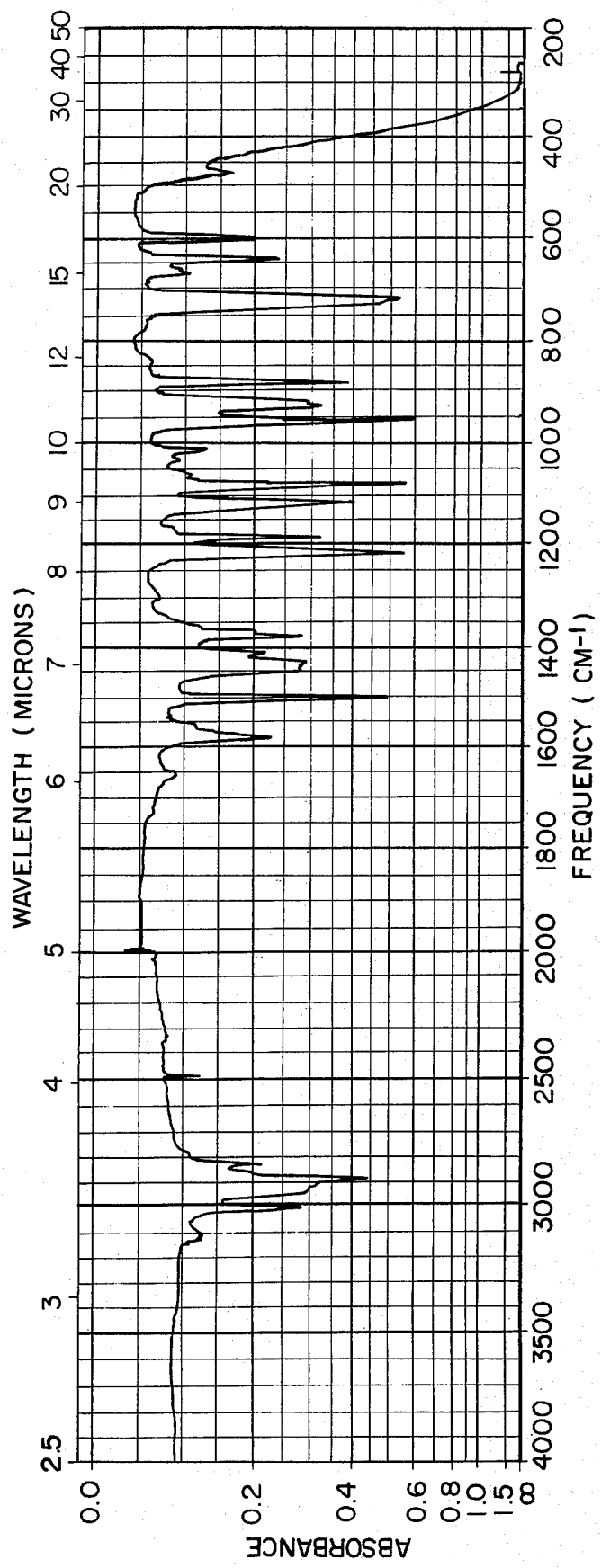

3-FURYL SULFIDES AND FOODSTUFF FLAVOR COMPOSITIONS COMPRISING SAME

BACKGROUND OF THE INVENTION

The present invention relates to novel 3-furyl sulfides.

Artificial flavoring agents for foodstuffs have received increasing attention in recent years. In many areas, such food flavoring agents are preferred over natural flavoring agents at least in part because of the uniform flavor that may be so obtained. For example, natural food flavoring agents such as extracts, essences, concentrates and the like are often subject to wide variation due to changes in the quality, type and treatment of the raw materials. Such variation can be reflected in the end product and results in unreliable flavor characteristics and uncertainty as to consumer acceptance and cost. Additionally, the presence of the natural product in the ultimate food may be undesirable because of increased tendency to spoil. This is particularly troublesome in convenience and snack food usage where such products as dips, soups, chips, prepared dinners, canned foods, sauces, gravies and the like are apt to be stored by the consumer for some time prior to use.

The fundamental problem in preparing artificial flavoring agents is that of achieving as nearly as possible a true flavor reproduction. This generally proves to be a difficult task since the mechanism for flavor development in many foods is not understood. This is notable in products having meaty, roasted, sweet meat, pot roast, bloody, nutty, green, tomato-like, fishy, hydrolyzed vegetable protein-like and/or alliacious (e.g. oniony, garlic or chive-like) flavor characteristics.

Reproduction of meaty, roasted, sweet meat, pot roast, bloody, nutty, beef broth-like, green, tomato-like, fishy, hydrolyzed vegetable protein-like and/or alliacious (e.g. oniony, garlic or chive-like) flavors and aromas has been the subject of the long and continuing search by those engaged in the production of foodstuffs. The severe shortage of foods, especially protein foods, in many parts of the world has given rise to the need for utilizing non-meat sources of proteins and making such proteins as palatable and as meat-like as possible. Hence, materials which will closely simulate or exactly reproduce the flavor and aroma of roasted meat products and liver products are required. In addition, a need exists for imparting, modifying or enhancing onion-like flavors and other alliacious type of flavors (e.g. chive and garlic) flavors as well as green notes and tomato-like nuances to foodstuffs.

Moveover, there are a great many meat containing or meat based foods presently distributed in a preserved form. Examples being condensed soups, dry-soup mixes, dry meat, freeze-dried or lyophilized meats, packaged gravies and the like. While these products contain meat or meat extracts, the fragrance, taste and other organoleptic factors are very often impaired by the processing operation and it is desirable to supplement or enhance the flavors of these preserved foods with versatile materials which have either meaty, roasted, sweet meat, pot roast, bloody, nutty, beef broth-like, green tomato-like, fishy, hydrolyzed vegetable protein-like and/or alliacious (e.g. oniony, garlic or chive-like) aroma and taste nuances.

U.S. Pat. No. 3,666,495 has to do with certain furan derivatives having desirable meat, roast meat and roasted fragrance and flavor notes. Among the furan derivatives disclosed in said patent are methyl (2-methyl-3-furyl) trisulfide obtained by the reaction of 2-methyl-3-furan thiol with methyl disulfur chloride at a temperature of from −60° C to 0° C, and methyl (2-methyl-3-furyl) disulfide obtained by reacting 2-methyl-3-furan thiol with methane sulfenyl chloride.

Such 3-furyl alkyl disulfides possess organoleptic properties different in flavor character and intensity from the 3-furyl sulfides of our invention.

U.S. Pat. No. 3,836,563 issued on Sept. 17, 1974 broadly discloses 3-furyl alkyl sulfides having the structure:

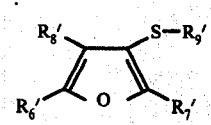

wherein $R_6'$ may be alkyl such as methyl, ethyl, n-propyl, isopropyl, n-butyl, isobutyl, n-hexyl, n-octyl and n-nonyl (See Col. 4, lines 10-18) and $R_7'$, $R_8'$ and $R_9'$ are either hydrogen or alkyl. Such 3-furyl alkyl sulfides of U.S. Pat. No. 3,836,563 possess organoleptic properties different in flavor character and intensity from the 3-furyl sulfides of our invention.

THE INVENTION

The present invention provides novel 3-furyl sulfides for altering the organoleptic properties of foodstuffs. Briefly, the novel compounds of our invention are 3-furyl sulfides having the formula:

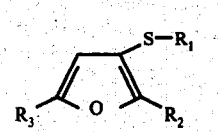

wherein $R_1$ is selected from the group consisting of aralkyl, nitrogen heterocyclic, alkenyl and alkylthioalkyl; and $R_2$ and $R_3$ are each selected from the group consisting of hydrogen and methyl, at least one of $R_2$ and $R_3$ being methyl.

Thus, for example, 3-furyl sulfides contemplated within the scope of our invention are:

| 3-Furyl Sulfide Compound | Structure |
|---|---|
| (2-methyl-3-furyl)(2-pyridylmethyl)sulfide | 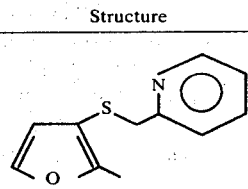 |
| (2-pyridylmethyl)(2,5-dimethyl-3-furyl)sulfide | 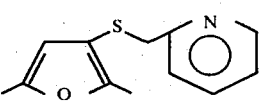 |
| (3,6-dimethyl-2-pyrazinyl)(2-methyl-3-furyl)sulfide | 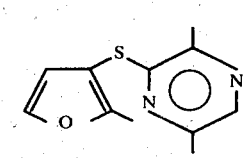 |
| (3-isobutyl-2-pyrazinyl)(2-methyl-3-furyl)sulfide | 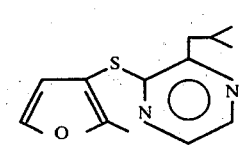 |
| (Allyl)(2-methyl-3-furyl)sulfide | 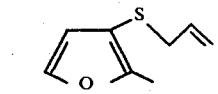 |
| (2-methyl-2-propenyl)(2-methyl-3-furyl)sulfide | 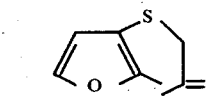 |
| (2-methyl-3-furyl)(methylthiomethyl)sulfide | 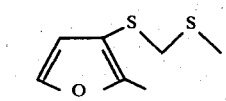 |
| (Benzyl)(2-methyl-3-furyl)sulfide | 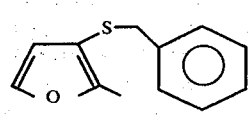 |
| (2-butenyl)(2-methyl-3-furyl)sulfide | 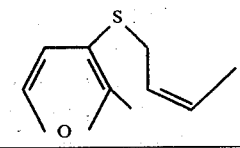 |

The 3-furyl sulfides of our invention can be prepared by a process comprising the steps of:

i. Providing a 2-ene-1,4-dione having the structure:

ii. Intimately admixing said 2-ene-1,4-dione with an alkane thiol having the formula $R_1SH$ thereby providing a substituted or unsubstituted 2-thia substituted 1,4-dione having the structure:

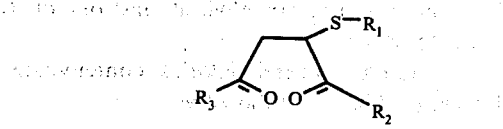

iii. Cyclizing said 2-thia substituted 1,4-dione to form a substituted or unsubstituted 3-furyl sulfide having the formula:

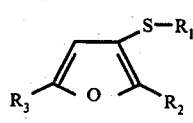

wherein $R_1$ is selected from the group consisting of aralkyl, nitrogen heterocyclic, alkenyl and alkylthioalkyl; and $R_2$ and $R_3$ are each hydrogen or methyl; at least one of $R_2$ and $R_3$ being methyl. Either $R_2$ or $R_3$ may be hydrogen in the event that in step (ii) the 2-ene-1,4-dione is admixed with the alkane thiol having the formula $R_1SH$ in the presence of an organic base such as piperidine, pyridine, triethyl amine, quinoline or alpha-picoline or a mixture thereof.

The 2-ene-1,4-dione may be prepared by reacting 2,5-dialkoxy-2,5-dialkyl-2,5-dihydrofuran with a weak acid hydrolysis agent such as 1% aqueous acetic acid under reflux conditions. The resulting material will be in the case of starting with 2,5-dimethoxy-2,5-dimethyl-2,5-dihydrofuran, cis-3-hexen-2,5-dione.

The resulting 2-ene-1,4-dione is then reacted with a thiol having the formula $R_1SH$ wherein $R_1$ is selected from the group consisting of aralkyl, nitrogen heterocyclic, alkenyl and alkylthioalkyl.

Examples of such thiols are:

1-mercaptomethyl-pyridine
2-mercapto-3,5-dimethyl-pyrazine
2-mercapto-3-isobutyl-pyrazine
allyl mercaptan
mercaptomethyl methyl sulfide
benzyl mercaptan
1-mercapto-2-butene The reaction may be carried out in a solvent such as water or an ether such as diethyl ether or a hydrocarbon such as benzene or hexane or cyclohexane. The reaction may also be carried out without the use of a solvent. The reaction may be carried out under reflux conditions, although temperatures varying from 0° up to 60° C are suitable and will give rise to commercially suitable yields. When the reaction is carried out with highly volatile reactants, e.g., methyl mercaptan, higher pressures than atmospheric pressure are preferred, e.g., three atmospheres pressure.

The aforementioned 2-thia substituted 1,4-diones are then cyclized to form substituted or unsubstituted 3-thia furans according to the following reaction:

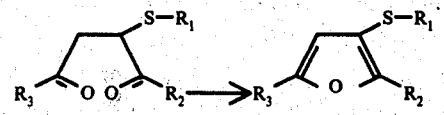

wherein $R_1$, $R_2$ and $R_3$ are defined as above. The resulting 3-furyl sulfides (novel compounds of our invention) are used for their organoleptic properties.

The cyclization reaction carried out in cyclizing the 2-thia substituted 1,4-dione is carried out in the presence of a cylization agent, preferably, isopropenyl acetate. The cyclization is also carried out in the presence of such a catalyst as concentrated sulfuric acid, zinc chloride, boron triflouride, aluminum trichloride, and para-toluene sulfonic acid, each of these being acid catalysts. Preferably, the ratio of isopropenyl acetate to 2-thia substituted 1,4-dione is 4 or 5:1. The ratio of acid catalyst to isopropenyl acetate is from 0.001 up to 0.05 (mole ratio). The cyclization reaction may be run at temperatures of between 25° C up to reflux at atmospheric pressure (96° C). Still greater reflux temperatures may be used if the pressure is greater than atmospheric. Furthermore, in place of isopropenyl acetate as a cyclization agent, acetic anhydride or propionic anhydride may be used. The mole ratio of cyclization agent to 2-thia substituted 1,4-dione is preferably 4 to 5:1.

The reaction product is then purified by appropriate extraction and distillation techniques.

The 3-furyl sulfides of our invention can also be prepared by reacting 3-furan thiols, e.g. 2-methyl-3-furan thiol with an appropriate aralkyl halide or nitrogen heterocyclic halide, or alkenyl halide or alkylthiolalkyl halide (e.g. bromide or chloride); (i) in the presence of a base such as an alkali metal alkoxide (e.g., sodium methoxide); (ii) at a temperature in the range of 15°-65° C; and (iii) in a suitable solvent, e.g., an anhydrous lower alkanol such as anhydrous methanol, ethanol or isopropanol. Thus, for example, alpha picolyl chloride hydrochloride, when reacted with 2-methyl-3-furan thiol in anhydrous methanol in the presence of sodium methoxide at a temperature of 24° C will yield (2-methyl-3-furyl)(2-pyridylmethyl) sulfide. Thus, as a further example, in a methanol solvent sodium methylate is reacted with 2-methyl-3-furan thiol to form the corresponding mercaptide which is, in turn, reacted with allyl bromide at reflux temperature and 1 atmosphere pressure thereby forming (allyl)(2-methyl-3-furyl) sulfide.

The following compounds of our invention produced using the above processes have useful organoleptic properties giving rise to their use as foodstuff flavors as set forth in an illustrative manner in the following table:

| 3-Furyl Sulfide Compound | Structure | Flavor Properties |
|---|---|---|
| (2-methyl-3-furyl)(2-pyridylmethyl) sulfide | | Sweet and meaty aroma and a sweet meaty and nutty flavor with metallic and mouth feel nuances |
| (2-pyridylmethyl)(2,5-dimethyl-2-furyl)sulfide | | Tomato-like nuance and sweet meat nuances. |

-continued

| 3-Furyl Sulfide Compound | Structure | Flavor Properties |
|---|---|---|
| (3,6-dimethyl-2-pyrazinyl)(2-methyl-3-furyl) sulfide | | Sweet, meaty, roasted aroma and a sweet, meaty rubbery flavor with metallic and bloody nuances |
| (3-isobutyl-2-pyrazinyl)(2-methyl-3-furyl) sulfide | | Sweet, beef broth-like, yeasty aroma with hydrolyzed vegetable protein-like vitamin B complex-like nuances. |
| (Allyl)(2-methyl-3-furyl) sulfide | | Onion and garlic aroma with a fishy, metallic and chive-like flavor and green, onion, burning nuances. |
| (2-methyl-2-propenyl)(2-methyl-3-furyl)sulfide | | Meaty, beef broth aroma and a meaty, sweet meat, beef broth flavor with pot roast and nutty nuances. |
| (2-methyl-3-furyl)(methylthiomethyl) sulfide | | Wheaty/green and sulfury aroma and a sweet, wheaty/green sulfury flavor with cuminic, metallic, scallion and meaty nuances. Its use level, in food flavors, is of the order of 0.0001 parts per million |
| (Benzyl)(2-methyl-3-furyl) sulfide | | Sweet, pot roast, meaty aroma with a roasted nuance and a sweet, pot roast meaty flavor with brazil nut-like and roasted nuances. |
| (2-butenyl)(2-methyl-3-furyl) sulfide | | Rubbery, sulfury green aroma and a metallic bloody meaty flavor, with sulfury, green and burnt nuances. |

The 3-furyl sulfides according to the present invention can be used to alter, vary, fortify, modify, enhance or otherwise improve the organoleptic properties, including flavor and/or aroma, of a wide variety of materials which are ingested, consumed or otherwise organoleptically sensed. The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor or aroma impression to modify the organoleptic character. The materials which are so altered are generally referred to herein as consumable materials.

Such 3-furyl sulfides of this invention are accordingly useful in flavoring compositions. Flavoring compositions are herein taken to mean those which contribute part of the overall flavor impression by supplementing or fortifying a natural or artificial flavor in a material, as well as those which supply substantially all the flavor and/or aroma to a consumable article.

The term "foodstuff" as used herein includes both solid and liquid ingestible materials for man or animals, which materials usually do, but need not, have nutritional value. Thus, foodstuffs include meats, gravies, soups and convenience foods, vegetables, snack foods, dog and cat foods, other veterinary products and the like.

When the 3-furyl sulfides according to this invention are used in a food flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners surface active agents, conditioners, and flavor intensifiers.

When the 3-furyl sulfides of our invention are used to modify or enhance or alter the aroma or taste of meat flavored substances or substances to be meat flavored, examples of preferred co-flavoring adjuvants are:

Methyl thiazole alcohol (4-methyl-5-beta-hydroxyethyl thiazole);
2-Methyl butanethiol;
4-Mercapto-2-butanone;
3-Mercapto-2-pentanone;

1-Mercapto-2-propanone;
Benzaldehyde;
Furfural;
Furfuryl alcohol;
2-Mercaptopropionic acid;
2-Methylfuran-3-thiol;
2-Methyldihydrofuran-3-thiol;
2-Methyltetrahydrofuran-3-thiol;
2-Ethylfuran-3-thiol;
2-Ethyldihydrofuran-3-thiol;
2-Ethyltetrahydrofuran-3-thiol;
2-Propylfuran-3-thiol;
2-Isopropylfuran-3-thiol;
2-Isopropyldihydrofuran-3-thiol;
2-Isopropyltetrahydrofuran-3-thiol;
2-Propyldihydrofuran-3-thiol;
2,5-Dimethylfuran-3-thiol;
2,5-Dimethyldihydrofuran-3-thiol;
2,5-Dimethyltetrahydrofuran-3-thiol;
2,5-Diethylfuran-3-thiol;
2,5-Diethyltetrahydrofuran-3-thiol;
2-Ethyl-5-methylfuran-3-thiol;
2-Methyl-5-ethylfuran-3-thiol;
2-Ethyl-5-methyldihydrofuran-3-thiol;
2-Ethyl-5-methyltetrahydrofuran-3-thiol;
2,5-Dipropylfuran-3-thiol;
2,5-Diisopropylfuran-3-thiol;
5-Isopropyl-2-methylfuran-3-thiol;
2-Butylfuran-3-thiol;
2-Ethyl-5-propyltetrahydrofuran-3-thiol;
Bis(2-methyl-3-furyl) sulfide;
Bis(2-methyl-3-furyl) disulfide;
Bis(2-ethyl-3-furyl) sulfide;
Bis(2-ethyl-3-furyl) disulfide;
Bis(2,5-dimethyl-3-furyl) sulfide;
Bis(2,5-dimethyl-3-furyl) disulfide;
Bis(2-methyl-3-dihydrofuryl) sulfide;
Bis(2-methyl-3-tetrahydrofuryl) sulfide;
Bis(2-methyl-3-tetrahydrofuryl) disulfide;
Bis(2-methyl-3-dihydrofuryl) disulfide;
Bis(2,5-diethyl-3-dihydrofuryl) sulfide;
Bis(2,5-diethyl-3-furyl) sulfide;
Bis(2-ethyl-5-methyl-3-furyl) disulfide;
Bis(2,5-diethyl-3-furyl) disulfide;
bis(2,5-dipropyl-3-furyl)disulfide
Bis(2,5-dipropyl-3-furyl) sulfide;
Bis(2,5-dibutyl-3-furyl) disulfide;
Bis(5-ethyl-2-methyl-3-dihydrofuryl) disulfide;
Bis(2-isopropyl-3-furyl) sulfide;
Bis(2-isopropyl-3-furyl) disulfide;
Bis(2-isopropyl-3-dihydrofuryl) sulfide;
Bis(2-isopropyl-3-tetrahydrofuryl) disulfide;
Alkyl pyrazine;
Methyl pyrazine;
2-Ethyl-3-methyl pyrazine;
Tetramethyl pyrazine;
Dipropyl disulfide;
Methyl benzyl disulfide;
Alkyl thiophenes;
2-Butyl thiophene;
2,3-Dimethyl thiophene;
5-Methyl furfural;
Acetyl furan
2,4-Decadienal;
Guiacol;
Phenyl acetaldehyde;
δ-Decalactone;
d-Limonene;
Acetoin;
Amyl acetate;
Maltol;
Ethyl butyrate;
Levulinic acid;
Piperonal;
Ethyl acetate;
n-Octanal;
n-Pentanal;
Hexanal;
Diacetyl;
Monosodium glutamate;
Sulfur-containing amino acids;
Cysteine;
Hydrolyzed fish protein; and
Tetramethyl pyrazine When the 3-furyl sulfides according to this invention are used in order to enhance, modify or alter the aroma or taste of onion flavored or alliacious flavored foodstuffs or foodstuffs where onion or other alliacious flavors are to be imparted, examples of preferred co-flavoring adjuvants are:

Propyl propenyl disulfide;
Methyl propenyl disulfide;
Methyl propyl disulfide;
Propyl propenyl trisulfide;
Allyl propyl disulfide;
Allyl methyl disulfide;
Propyl propane thiosulfonate;
Hexyl propane thiosulfonate;
Hexyl propane thiosulfinate;
Hexyl thiopropionate;
n-butyl thiopropionate;
n-pentyl thiopropionate;
n-pentyl thiobutyrate;
n-hexyl thioisovalerate; and
n-methyl thio-n-heptanoate The 3-furyl sulfides or the compositions incorporating them, as mentioned above, can be combined with one or more vehicles or carriers for adding them to the particular product. Vehicles can be edible or otherwise suitable materials such as ethyl alcohol, propylene glycol, water and the like. Carriers include materials such as gum arabic, carrageenan, other gums and the like. The 3-furyl sulfides according to this invention can be incorporated with the carriers by conventional means such as spray-drying, drum-drying, and the like. Such carriers can also include materials for coacervating the 3-furyl sulfides (and other flavoring ingredients, as present) to provide encapsulated products. When the carrier is in emulsion the flavoring composition can also contain emulsifiers such as mono- and diglycerides of fatty acids and the like. With these carriers or vehicles, the desired physical form of the composition can be prepared.

The quantity of 3-furyl sulfide(s) utilized should be sufficient to impart the desired flavor characteristic to the product, but on the other hand, the use of an excessive amount of the derivative is not only wasteful and uneconomical, but in some instances too large a quantity may unbalance the flavor or other organoleptic properties of the product consumed. The quantity used will vary depending upon the ultimate foodstuff; the amount and type of flavor initially present in the foodstuff; the further process or treatment steps to which the foodstuff will be subjected; regional and other preference factors; the type of storage, if any, to which the product will be subjected; and the preconsumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff.

It is accordingly preferred that the ultimate compositions contain from about 0.0001 parts per million (ppm) to about 250ppm of 3-furyl sulfides. More particularly, in food compositions, it is desirable to use from about 0.0005 ppm to 100 ppm in enhancing or modifying or imparting flavors and in certain preferred embodiments of the invention, from 0.2 to 50 ppm of the derivatives are included to add positive flavors to the finished product. All parts, proportions, percentages, and ratios herein are by weight unless otherwise indicated.

The amount of 3-furyl sulfides of our invention to be utilized in flavoring compositions can be varied over a wide range to the foodstuff. Thus, amounts of one or more derivatives according to the present invention of from 2 ppm up to 80 percent of the total flavoring compositions can be incorporated in such compositions. It is generally found to be desirable to include from about 10 ppm up to about 20 percent of the 3-furyl sulfide in such compositions.

In the Drawings:

FIG. 17 is the NMR spectrum for the product of Example XVIII, wherein (2-butenyl)(2-methyl-3-furyl)sulfide is produced.

FIG. 18 is the IR spectrum for the product of Example XVIII, wherein (2-butenyl)(2-methyl-3-furyl) sulfide is produced.

Figure 1:
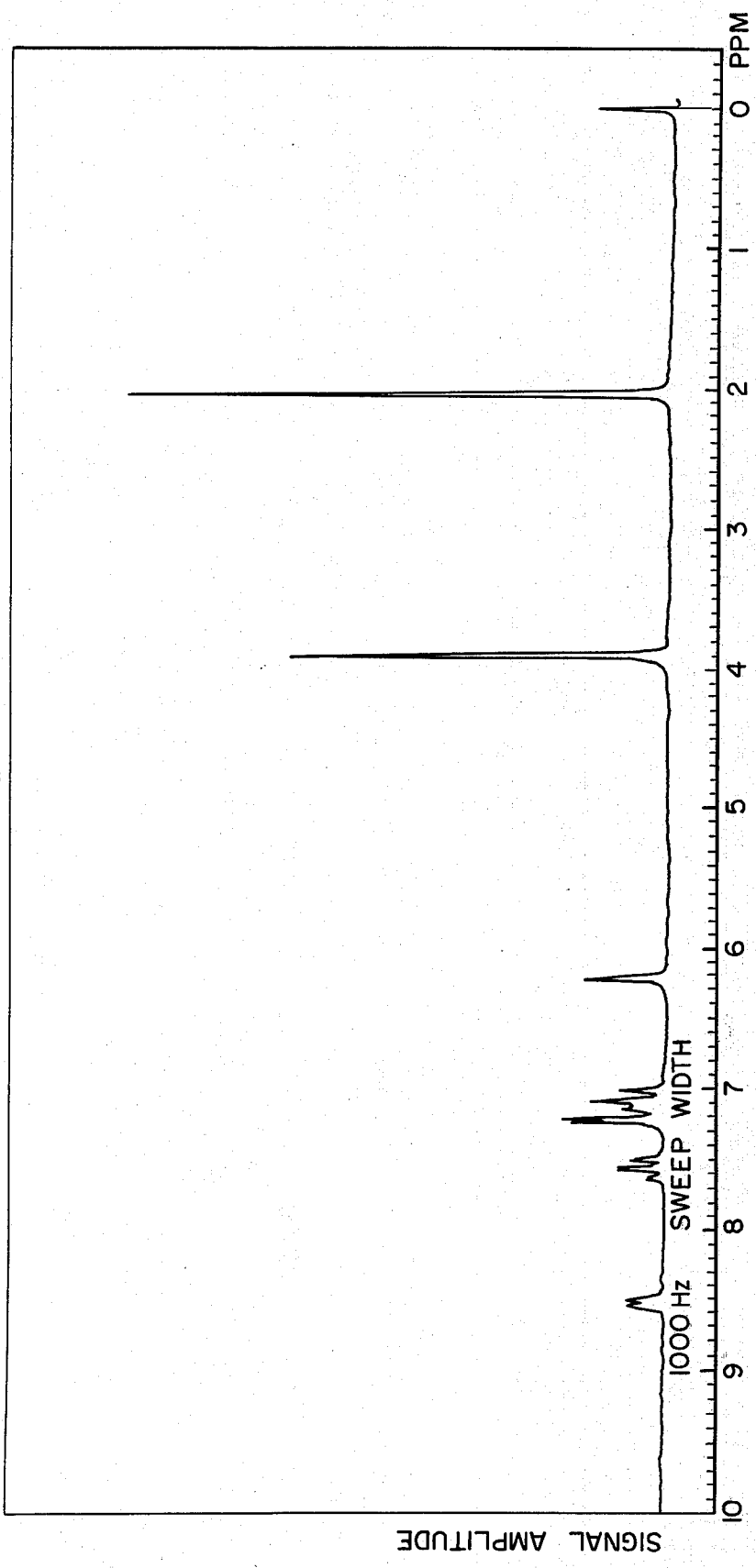
FIG. 1 is the NMR spectrum for the product of Example I, wherein (2-methyl-3-furyl)(2-pyridylmethyl)-sulfide is produced.
Figure 2:
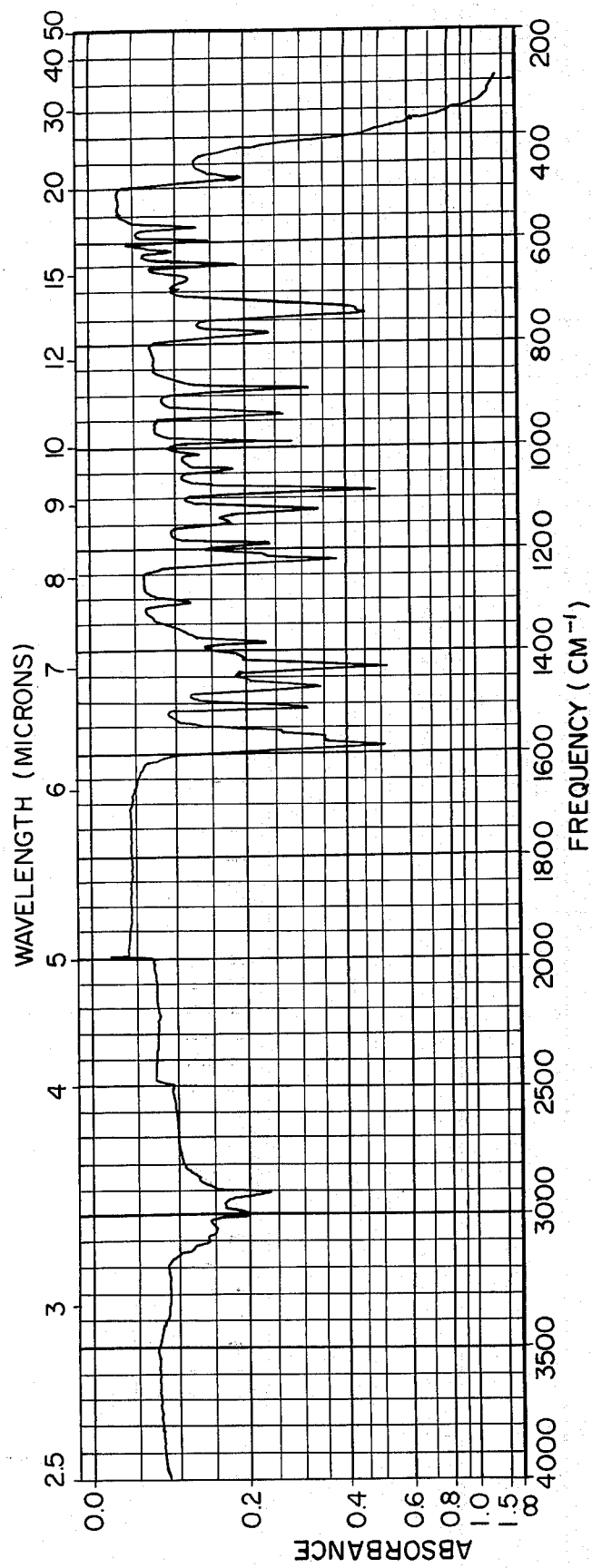
FIG. 2 is the IR spectrum for the product of Example I, wherein (2-methyl-3-furyl)(2-pyridylmethyl)sulfide is produced.
Figure 3:
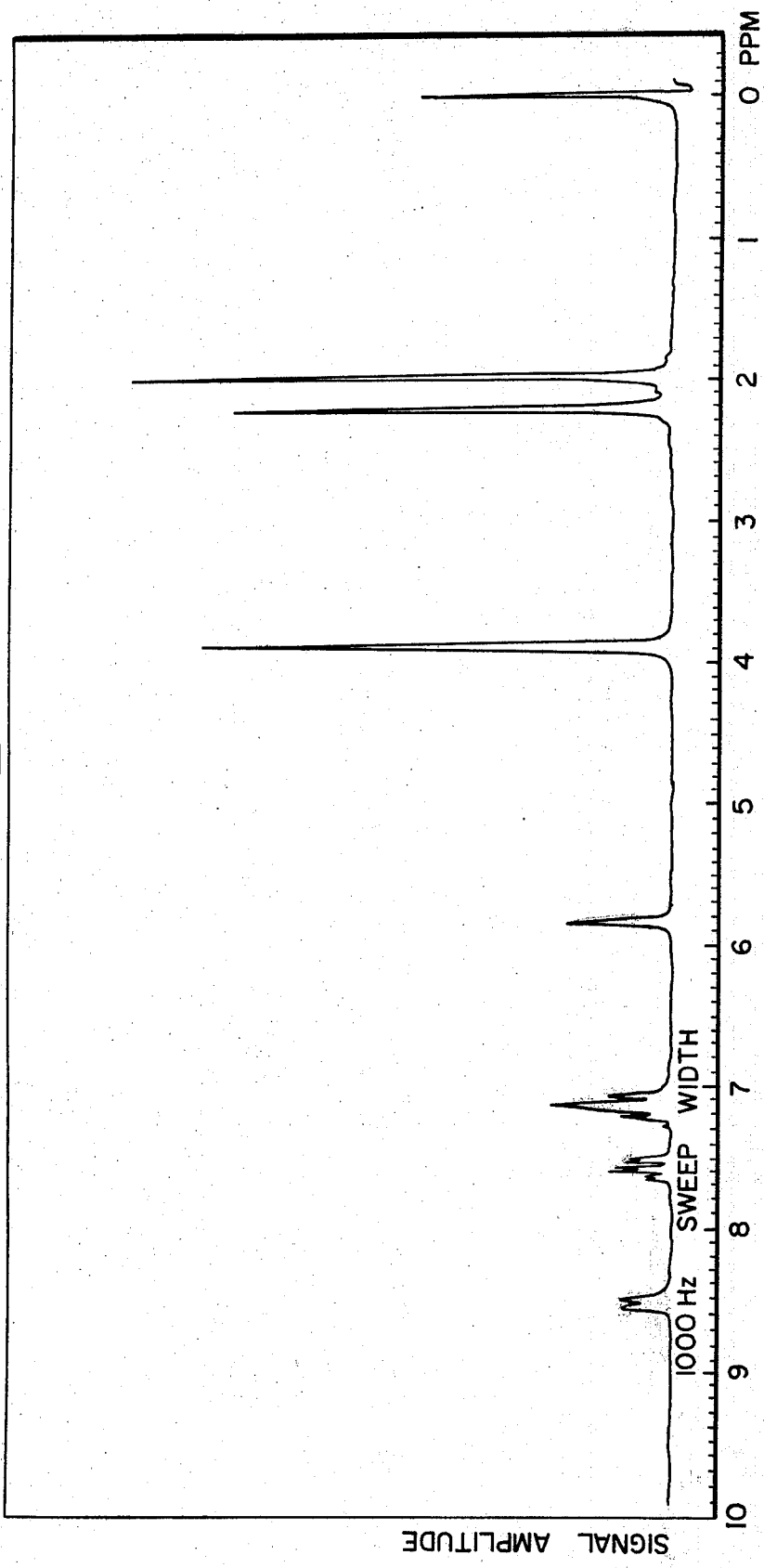
FIG. 3 is the NMR spectrum for the product of Example III, wherein (2-pyridylmethyl)(2,5-dimethyl-3-furyl) sulfide is produced.
Figure 4:
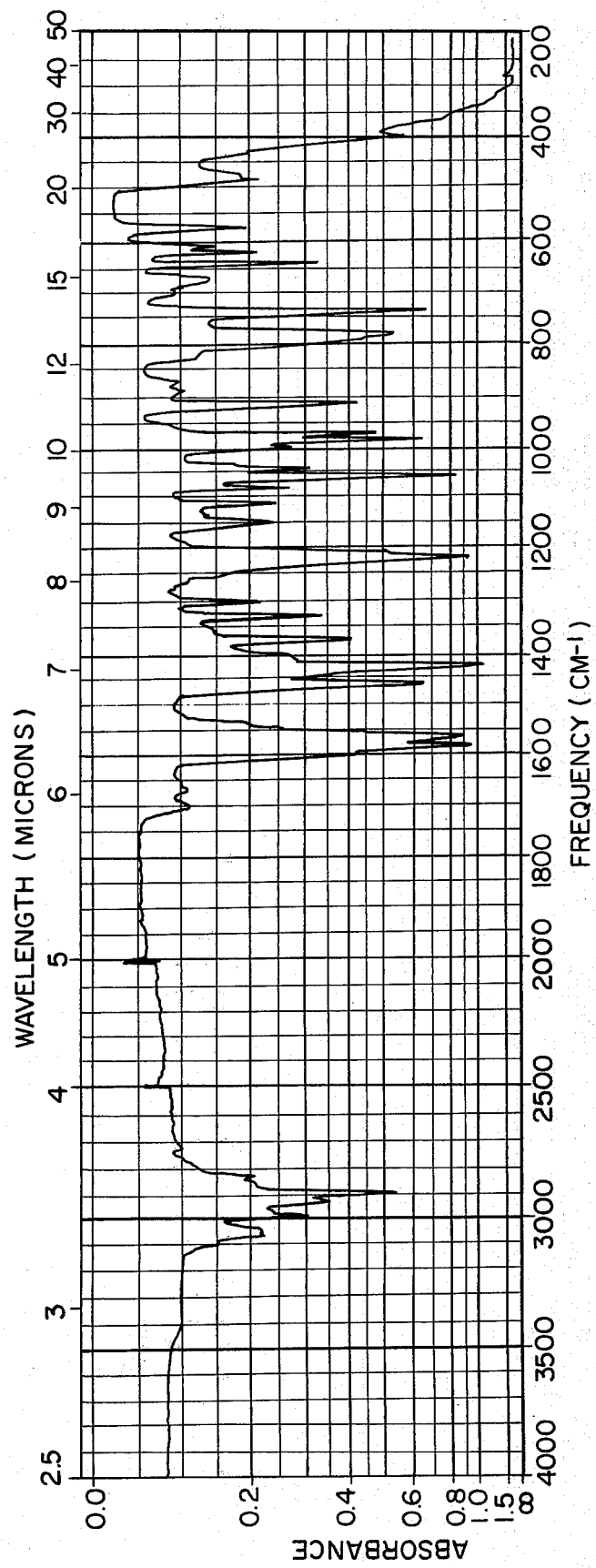
FIG. 4 is the IR spectrum for the product of Example III, wherein (2-pyridylmethyl)(2,5-dimethyl-3-furyl) sulfide is produced.
Figure 5:
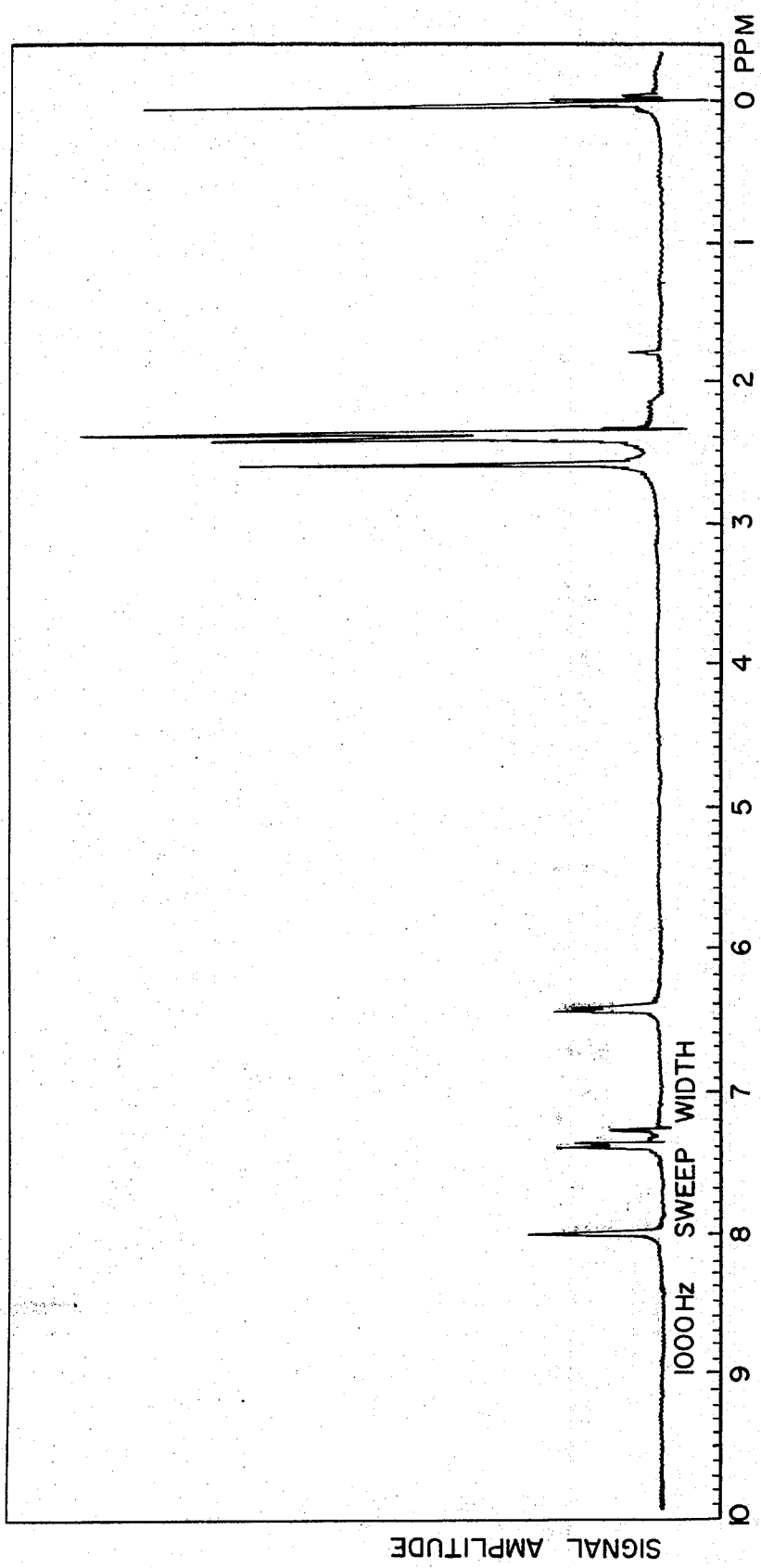
FIG. 5 is the NMR spectrum for the product of Example V, wherein (3,6-dimethyl-2-pyrazinyl)(2-methyl-3-furyl) sulfide is produced.
Figure 6:
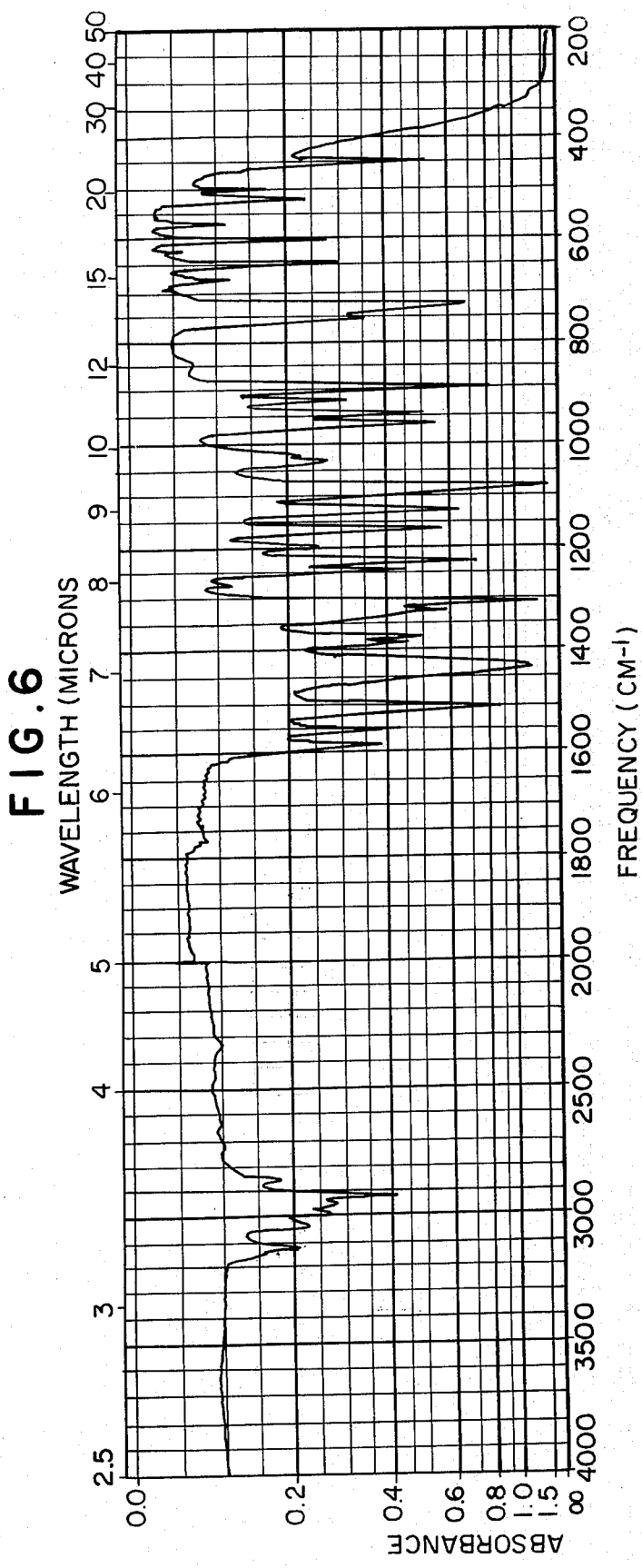
FIG. 6 is the IR spectrum for the product of Example V, wherein (3,6-dimethyl-2-pyrazinyl)(2-methyl-3-furyl) sulfide is produced.
Figure 7:
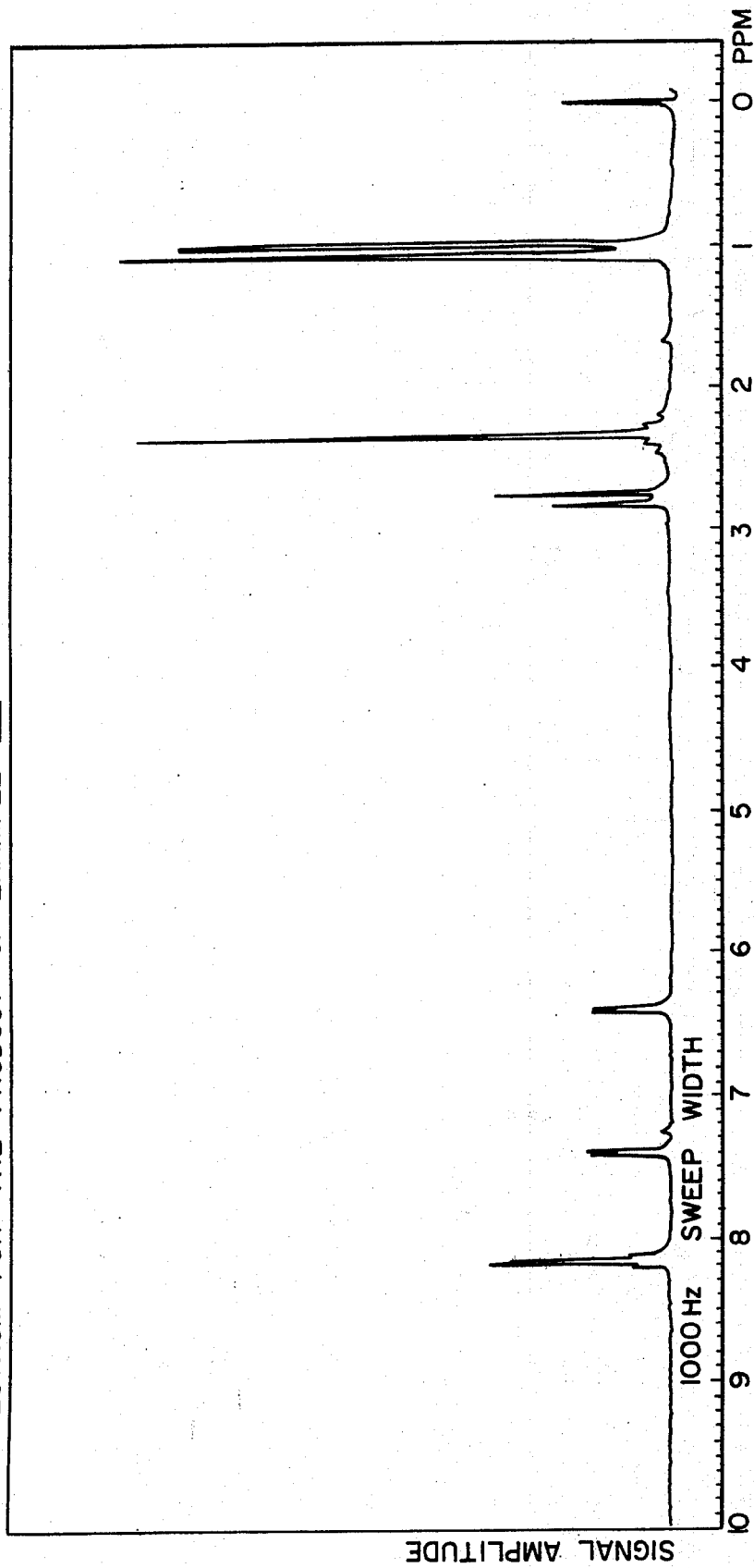
FIG. 7 is the NMR spectrum for the product of Example VII, wherein (3-isobutyl-2-pyrazinyl)(2-methyl-3-furyl) sulfide is produced.
Figure 8:
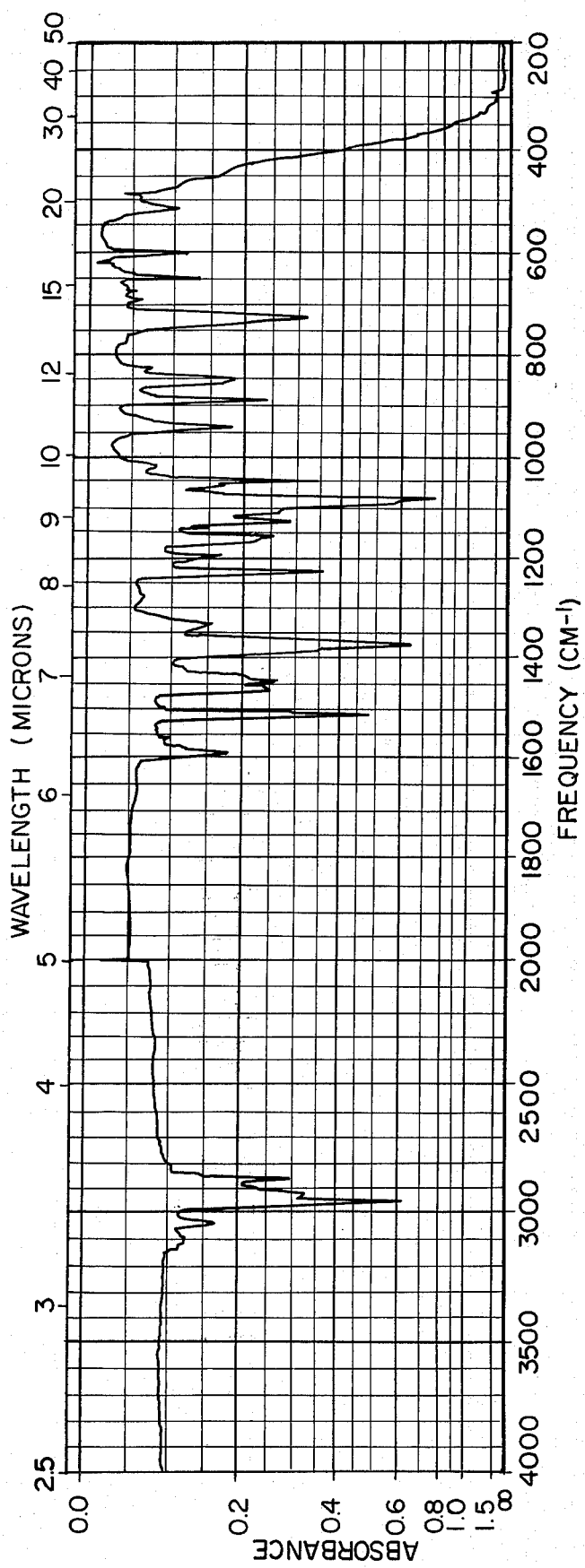
FIG. 8 is the IR spectrum for the product of Example VII, wherein (3-isobutyl-2-pyrazinyl)(2-methyl-3-furyl) sulfide is produced.
Figure 9:
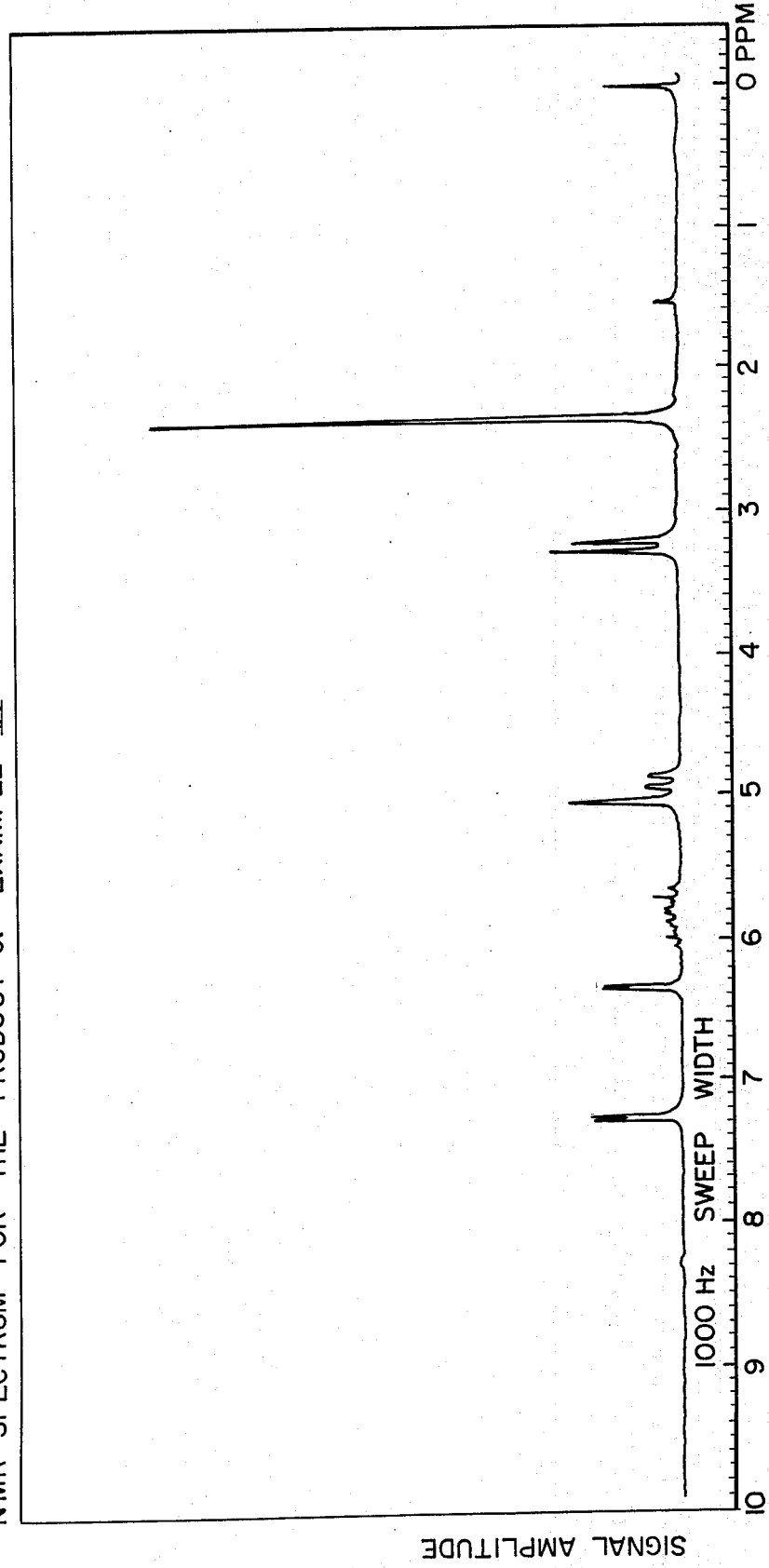
FIG. 9 is the NMR spectrum for the product of Example IX, wherein (allyl)(2-methyl-3-furyl)sulfide is produced.
Figure 10:
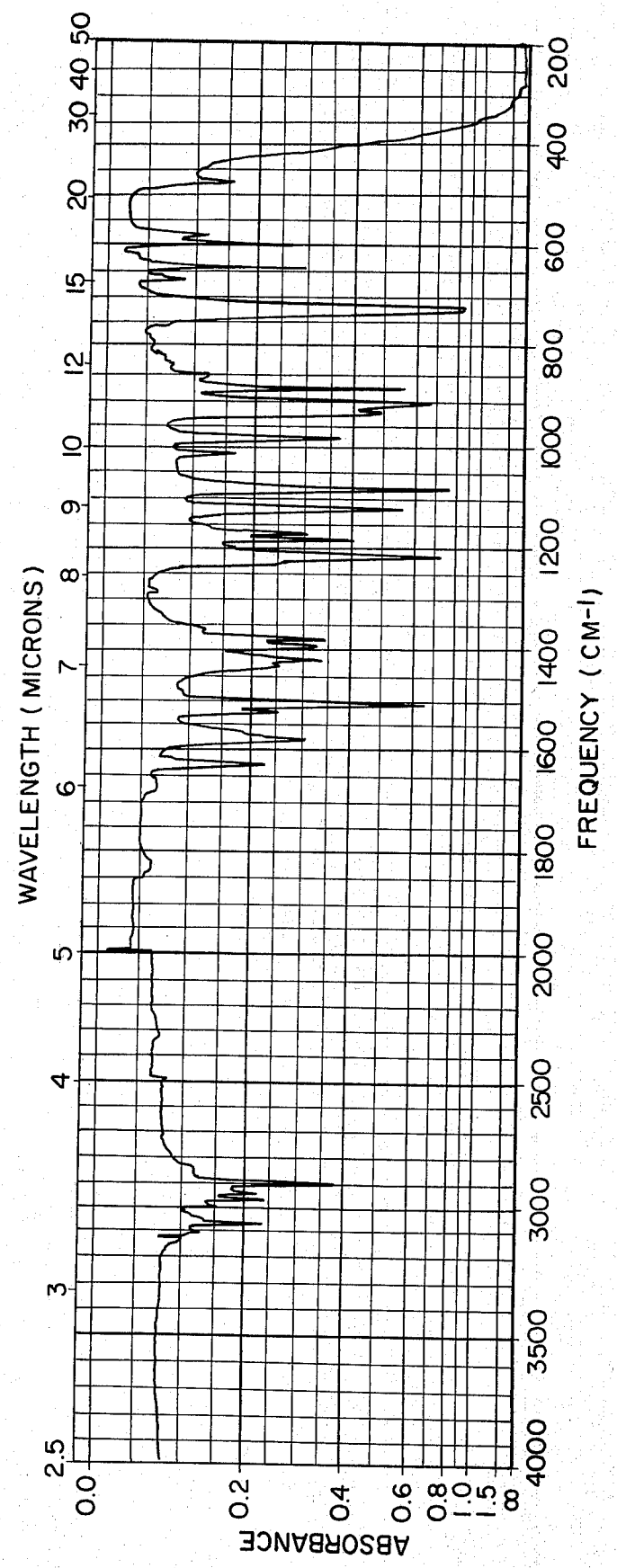
FIG. 10 is the IR spectrum for the product of Example IX, wherein (allyl)(2-methyl-3-furyl)sulfide is produced.
Figure 11:
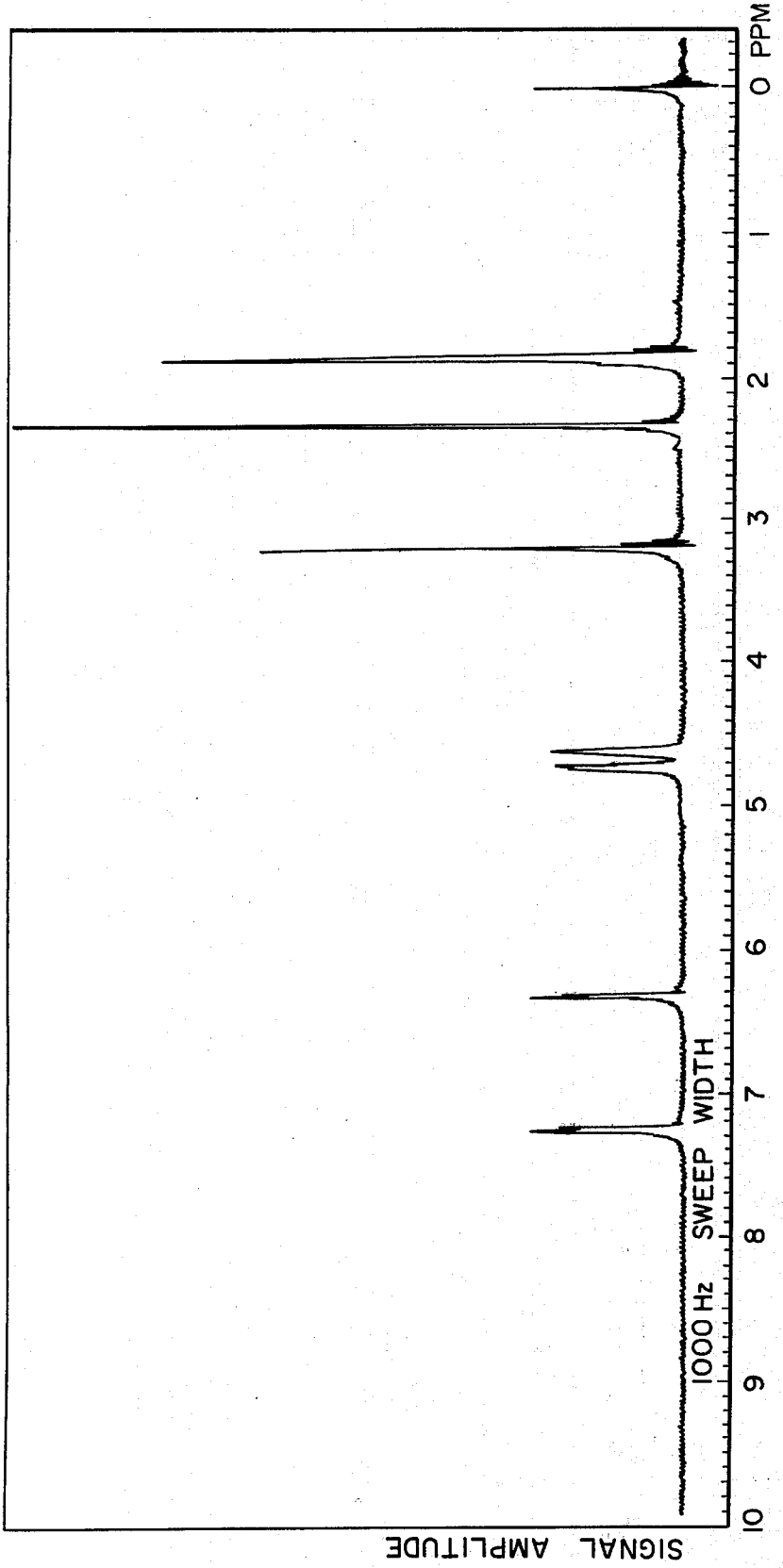
FIG. 11 is the NMR spectrum for the product of Example XI, wherein (2-methyl-2-propenyl)(2-methyl-3-furyl)sulfide is produced.
Figure 12:
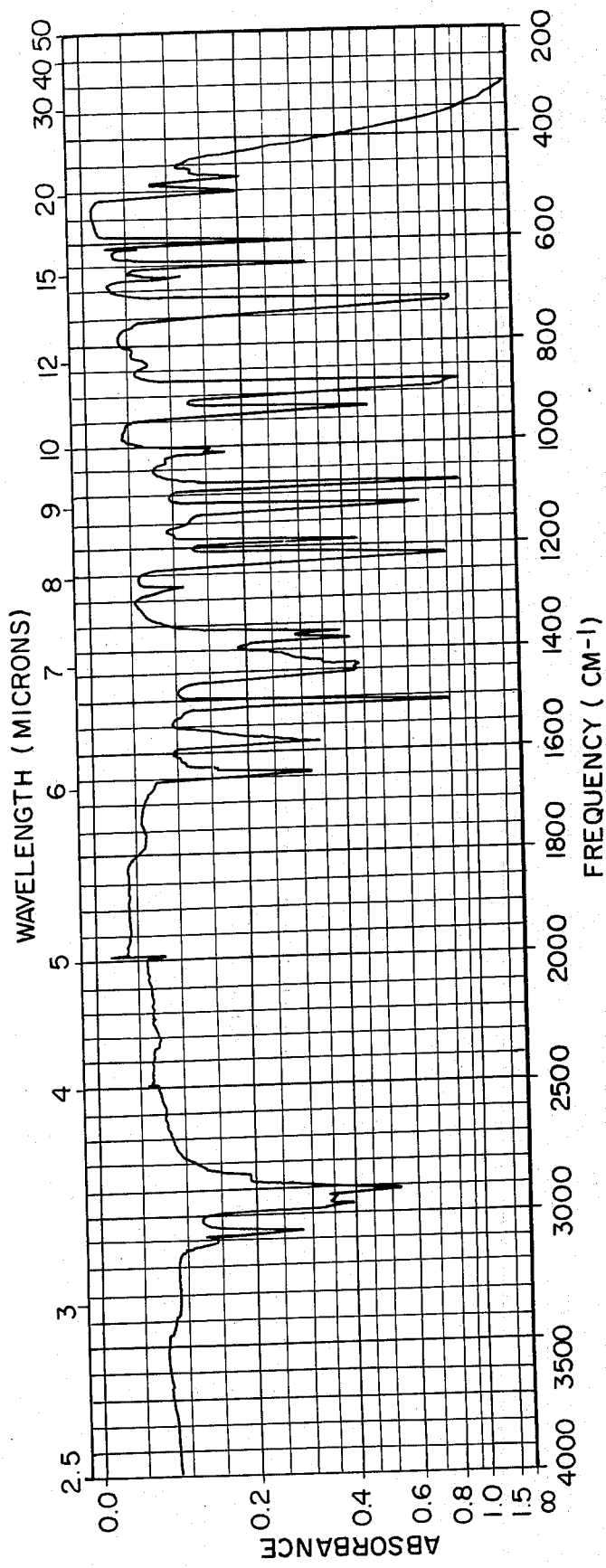
FIG. 12 is the IR spectrum for the product of Example XI, wherein (2-methyl-2-propenyl)(2-methyl-3-furyl)sulfide is produced.
Figure 13:
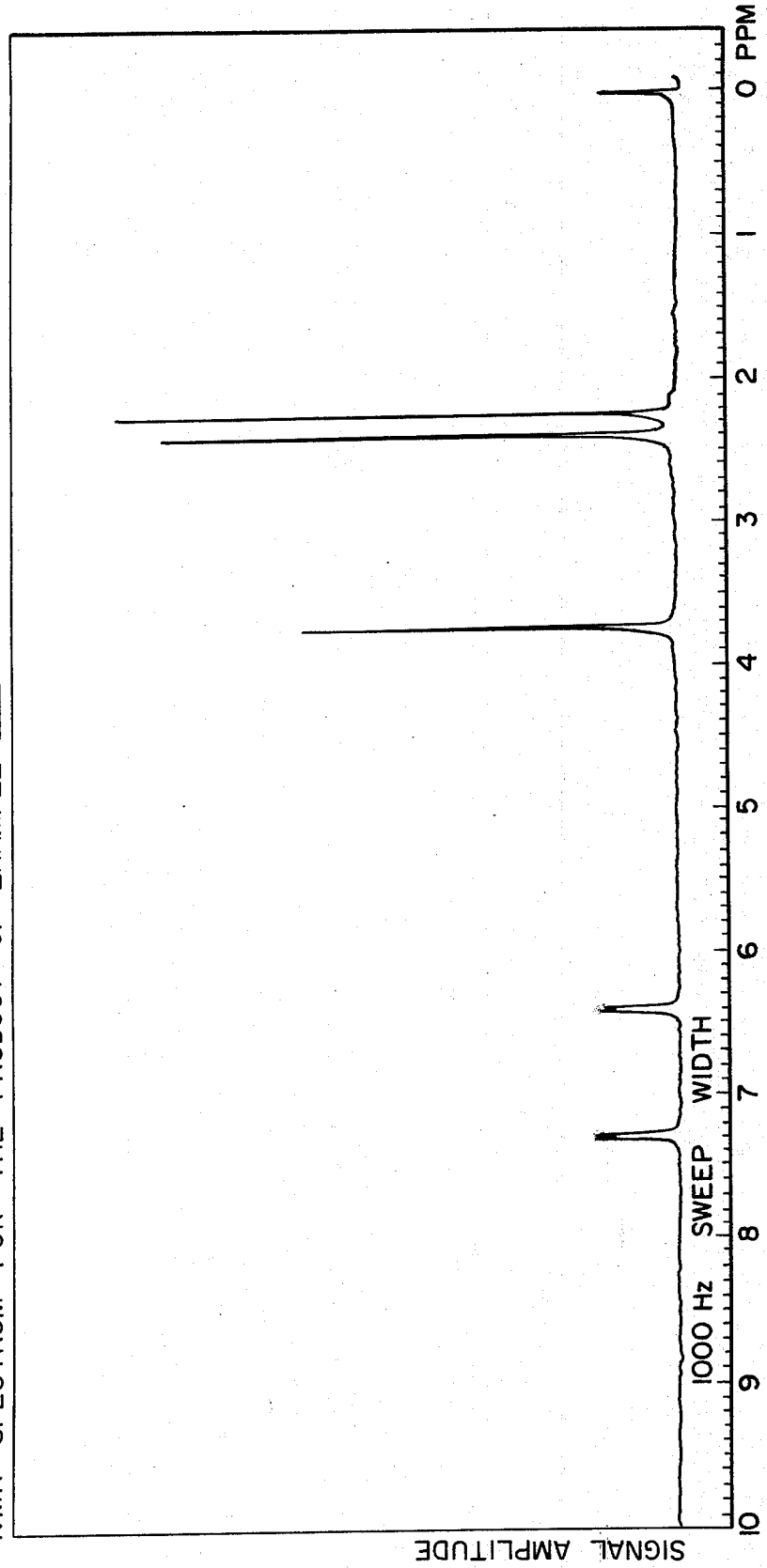
FIG. 13 is the NMR spectrum for the product of Example XIII, wherein (2-methyl-3-furyl)(methylthiomethyl)sulfide is produced.
Figure 14:
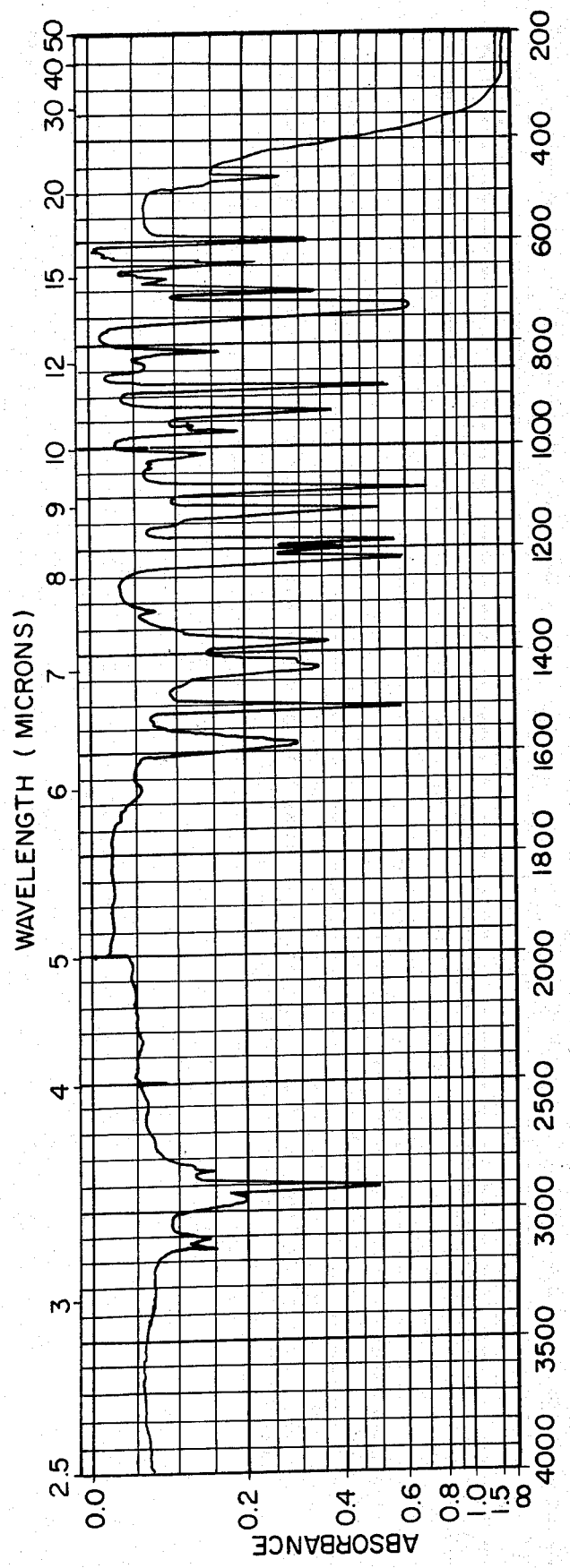
FIG. 14 is the IR spectrum for the product of Example XIII, wherein (2-methyl-3-furyl)(methylthiomethyl)sulfide is produced.
Figure 15:
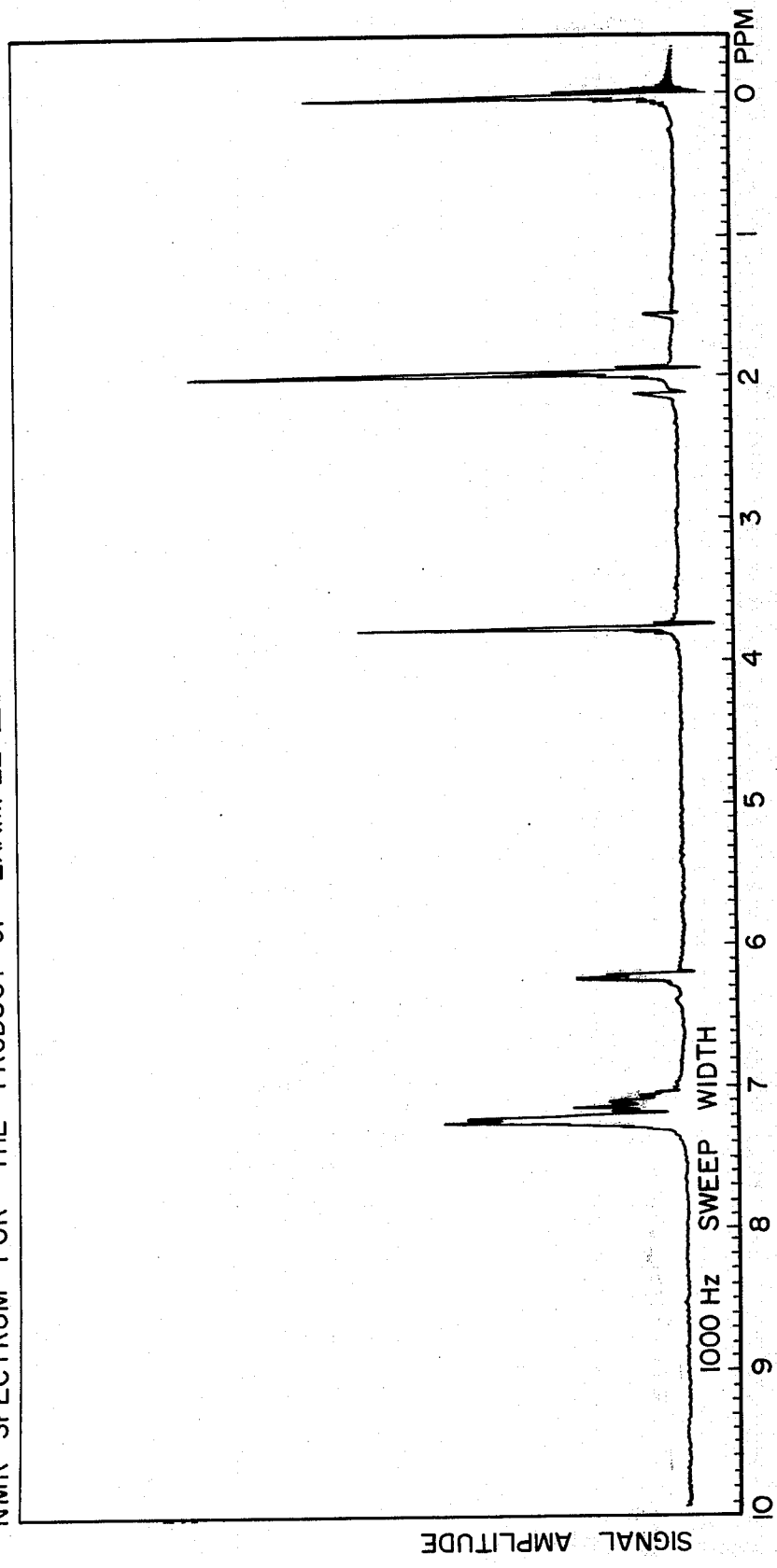
FIG. 15 is the NMR spectrum for the product of Example XVI, wherein (benzyl)(2-methyl-3-furyl)sulfide is produced.
Figure 16:
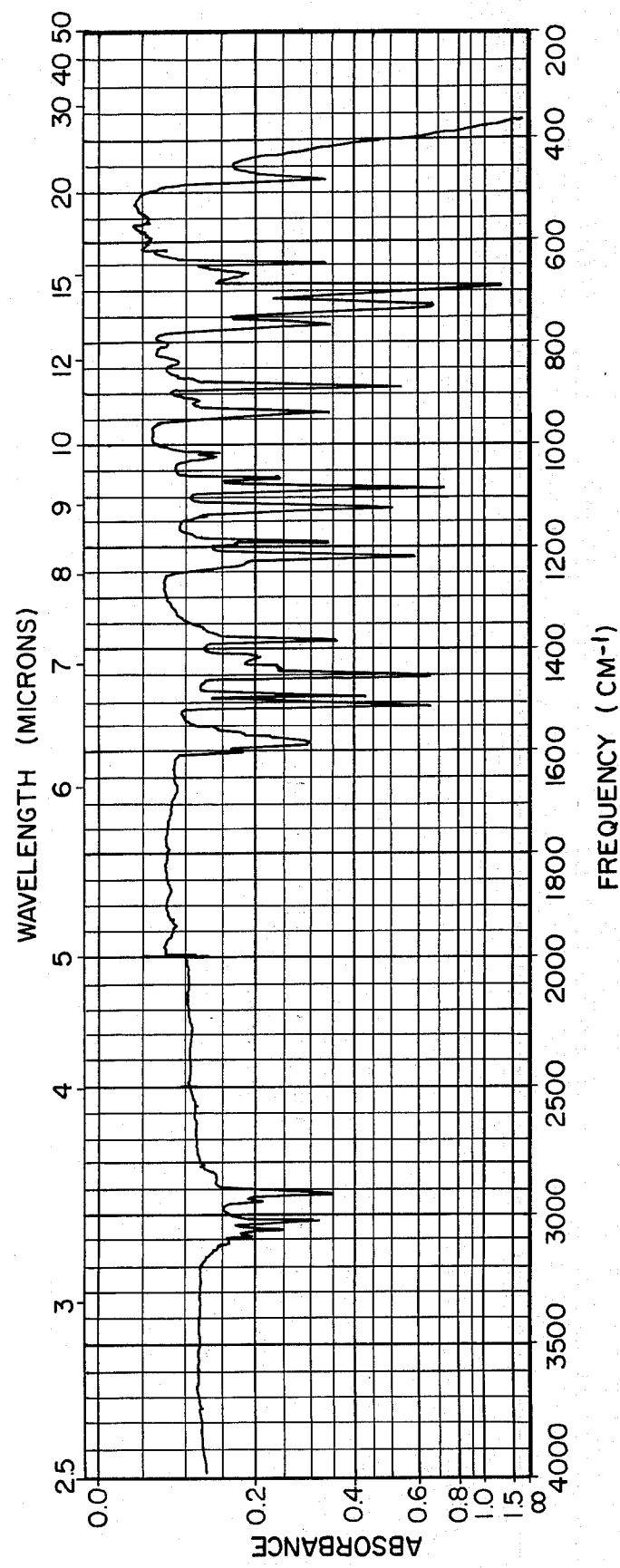
FIG. 16 is the IR spectrum for the product of Example XVI, wherein (benzyl)(2-methyl-3-furyl)sulfide is produced.

The following examples are given to illustrate embodiments of the invention as it is preferred to practice it. It will be understood that these examples are illustrative and the invention is not to be considered as restricted thereto except as indicated in the appended claims.

EXAMPLE I

Preparation of (2-Methyl-3-Furyl)(2-Pyridylmethyol)Sulfide

Reaction

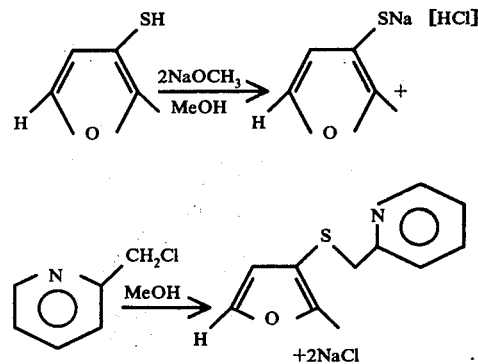

Into a 25 ml 3 neck round bottom flask equipped with magnetic stirrer, pot thermometer, Y tube, nitrogen inlet tube, reflux condenser and heating mantle is placed a solution of 0.54 g (0.01 moles) of sodium methoxide dissolved in 3 ml absolute methanol. The reaction mass is maintained at 25°–30° C and a solution of 0.57 g (0.005 moles) of 2-methyl-3-furan thiol in 3 ml absolute methanol is added to the reaction mass. While maintaining the reaction mass at 25° C, picolyl chloride hydrochloride (0.82 g; 0.005 moles) dissolved in 2 ml absolute methanol is added to the reaction mass. The reaction being exothermic, the reaction mass warms up to 42° C and a white solid precipitate forms. The reaction mass is then allowed to cool to 25° C (with stirring) over a period of 30 minutes. The reaction is then heated to reflux (60° – 65° C) under nitrogen and reflux is continued for a period of 1 hour. The reaction mass is cooled to 25° C. After remaining at room temperature for a period of 12 hours, 10 ml of water is added to the reaction mass with stirring, causing the reaction mass to now exist in two phases; an aqueous phase and an organic phase. The pH of the reaction mixture is 5. 7 ml of n-hexane is then added to the reaction mass with stirring and transferred to a separatory funnel. The aqueous layer is separated from the organic phase and extracted with 8 ml n-hexane after first diluting the aqueous phase with another 10 ml of water. The hexane extracts are combined, washed with 7 ml of saturated sodium chloride solution, dried over anhydrous sodium sulfate, gravity filtered, then concentrated on a rotary evaporator using water-aspirator vacuum.

The product is isolated by GLC trapping and NMR, IR and Mass Spectral analyses confirm that the resulting material, having a molecular weight of 205 has the structure:

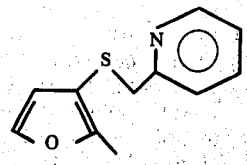

NMR analysis is as follows:

| SIGNAL | | INTERPRETATION | |
|---|---|---|---|
| 2.04 ppm | (s) | $CH_3-C=$ with O— | 3 H |
| 3.92 | (s) | $-S-CH_2-$ pyridine | 2 H |
| 6.22 | (d) | H on furan | 1 H |
| 7.08 | (m) | $H_3$, $H_5$ of pyridine | 2 H |
| 7.22 | (d) | H on furan | 1 H |
| 7.57 | (t) | $H_4$ of pyridine | 1 H |
| 8.52 | (d) | $H_6$ of pyridine | 1 H |

IR analysis is as follows:
730, 740, 885, 930, 990, 1085, 1120, 1220, 1430, 1465, 1510, 1565, 1585, 2910, 3000 cm$^{-1}$.

Mass Spectral Analysis is as follows:

| m/e | Relative Intensity |
|---|---|
| 39 | $10^5$ |
| 43 | $8^6$ |
| 45 | 6 |
| 51 | 6 |
| 65 | $14^2$ |
| 92 | $12^4$ |
| 93 | $100^1$ |
| 94 | 7 |
| 113 | 5 |
| M205 | $12^3$ |

This material has a sweet meat-like flavor and aroma with meaty mouthfeel nuances.

EXAMPLE II (2-methyl-3-furyl)(2-pyridylmethyl) sulfide prepared according to the process of Example I is added to a 2% aqueous solution of Wyler's "Beef Flavored Instant Bouillon" (manufactured by Wyler Foods, Division of Borden, Inc., Chicago, Ill., U.S.A.).

(Ingredients: salt, hydrolyzed vegetable protein, malto dextrin, sugar, beef fat, water, monosodium glutamate, "flavorings", corn sugar, beef extract, caramel color, hydrogenated vegetable fat, U.S. certified food color)

at the rate of 1 ppm. The resulting beef flavor has a sweet meat-like character. The meaty mouthfeel is improved.

EXAMPLE III

Preparation of
(2-Pyridylmethyl)(2,5-Dimethyl-3-Furyl)Sulfide

Reaction

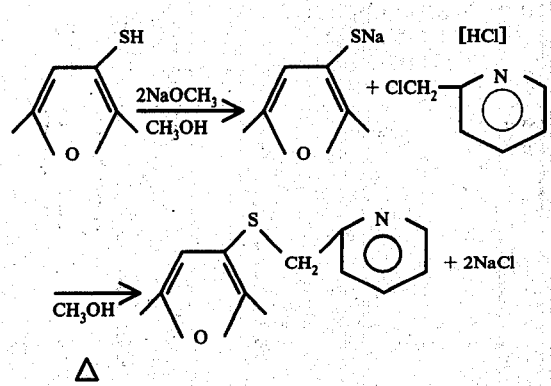

Into a 25 ml 3 neck round bottom flask equipped with magnetic stirrer, pot thermometer, Y tube, nitrogen inlet tube, reflux condenser and heating mantle, is placed a solution of 0.54 g (0.01 moles) of sodium methoxide dissolved in 3 ml absolute methanol. The reaction mass is maintained at 25°–30° C and a solution of 0.64 g (0.005 moles) of 2,5-dimethyl-3-furan thiol in 3 ml absolute methanol is added to the reaction mass. While maintaining the reaction at 25° C, picolyl chloride hydrochloride (0.82 g; 0.005 moles) dissolved in 2 ml absolute methanol is added to the reaction mass. The reaction being exothermic, the reaction mass warms up to 42° C and a white solid precipitate forms. The reaction mass is allowed to cool to 25° C with stirring over a period of 30 minutes. The reaction mass is then heated to reflux (60° – 65° C) under nitrogen and reflux is continued for a period of 1 hour. The reaction mass is cooled to 30° C and flushed with nitrogen. After remaining at room temperature for a period of 20 hours, 10 ml. of water is added to the reaction mass with stirring, causing the reaction mass to now exist in two phases; an aqueous phase and an organic phase. The pH of the reaction mixture is 5. 7 ml of n-hexane is then added to the reaction mass with stirring and transferred into a separatory funnel. The aqueous layer is separated from the organic phase and extracted with 8 ml n-hexane after first diluting the aqueous phase with another 10 ml of water. The hexane extracts are combined, washed with 7 ml of saturated sodium chloride solution, dried over anhydrous sodium sulfate, gravity filtered, and concentrated on a rotary evaporator using water-aspirator vacuum.

The product is isolated by GLC trapping and NMR, IR and Mass Spectral analyses confirm that the resulting material, having a molecular weight of 219 has the structure:

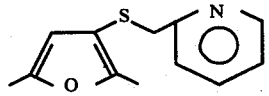

This material has a tomato-like nuance and a sweet meat nuance.

NMR analysis is as follows:

| SIGNAL | | INTERPRETATION | |
|---|---|---|---|
| 1.99 ppm | (s) | CH₃—C= (O—) | 3 H |
| 2.20 ppm | (s) | | 3 H |
| 3.90 | (s) | N-CH₂-S- (pyridine) | 2 H |
| 5.82 | (s) | H₄ of furan | 1 H |
| 7.12 | (t) | H₃, H₅ of pyridine | 2 H |
| 7.58 | (m) | H₄ of pyridine | 1 H |
| 8.54 | (d) | H₆ of pyridine | 1 H |

IR analysis is as follows:
645, 745, 780, 920, 980, 990, 1045, 1065, 1220, 1330, 1380, 1430, 1465, 1565, 1585, 2920, 2940, 3000 cm⁻¹.

Mass Spectral analysis is as follows:

| m/e | Relative Intensity |
|---|---|
| 39 | 10⁴ |
| 43 | 34² |
| 65 | 9 |
| 92 | 5 |
| 93 | 100¹ |
| 94 | 6⁶ |
| 127 | 8⁵ |
| M219 | 13³ |

EXAMPLE IV (2-pyridylmethyl)(2,5-dimethyl-3-furyl) sulfide prepared according to the process of Example III is added to a 2% solution of Wyler's "Beef Flavored Instant Bouillon" (manufactured by Wyler Foods, Division of Borden, Inc., Chicago, Ill., U.S.A.).

(Ingredients: salt, hydrolyzed vegetable protein, malto dextrin, sugar, beef fat, water, monosodium glutamate, flavorings, corn sugar, beef extract, caramel color, hydrogenated vegetable fat, U.S. certified food color)

at the rate of 2 ppm. The resulting improved beef broth flavor has tomato-like sweet meat nuances.

EXAMPLE V

Preparation of (3,6-Dimethyl-2-Pyrazinyl)(2-Methyl-3-Furyl)Sulfide Reaction

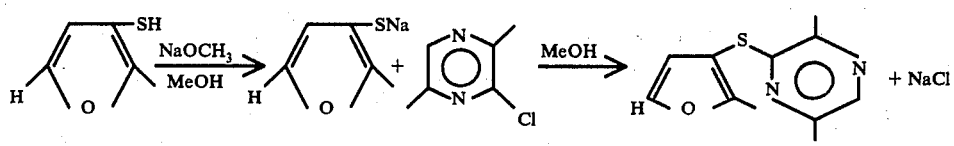

Into a 25 ml round bottom 3 neck flask equipped with magnetic stirrer, Y tube, nitrogen inlet, and reflux condenser with calcium chloride drying tube is added a solution of 0.27 g (0.005 moles) sodium methoxide in 3 ml absolute methanol. 0.57 g (0.005 moles) of 2-methyl-3-furan thiol dissolved in 3 ml absolute methanol is added slowly to the sodium methoxide solution with stirring while maintaining the reaction mass temperature at 22° – 25° C. The resulting yellow solution is permitted to stir for a period of 10 minutes. 0.71 g (0.005 moles) of 3-chloro-2,5-dimethyl-pyrazine dissolved in 1 ml absolute methanol is then added dropwise over a 2 minute period to the 2-methyl-3-furan thiol-sodium salt solution while maintaining the reaction mass temperature at 25° C. The temperature of the reaction mass is then raised to reflux (63° C) under nitrogen and refluxing is continued for a period of 5 hours.

At the end of this 5 hour period, the reaction mass is cooled down to 25° C and 10 ml of water is added with stirring. The pH of the reaction mass is lowered to a pH of 6 using 4% hydrochloric acid. 10 ml of n-hexane is added to the reaction mass causing there to be an organic phase and an aqueous phase. The aqueous phase is separated and extracted with 10 ml of hexane. The two hexane solutions are combined and washed with saturated sodium chloride solution and dried over anhydrous sodium sulfate. The dried material is then concentrated yielding 0.58 g of a crude oil. IR, NMR and Mass Spectral analyses confirm that the structure of the major material is this crude oil, isolated by GLC trapping, is:

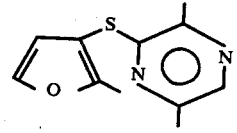

(GLC conditions: 8 foot × ¼ inches SE-30 column).

This material has a sweet, meaty, roasted aroma and a sweet, meaty rubbery flavor with metallic and bloody nuances.

NMR analysis is as follows:

| SIGNAL | | INTERPRETATION | |
|---|---|---|---|
| 2.34 ppm | (s) | CH₃-of furan | 6 H |
| 2.36 | (s) | CH₃ of pyrazine | |
| 2.56 | (s) | CH₃ of pyrazine | 3 H |
| 6.42 | (d) | H₄ of furan | 1 H |
| 7.38 | (d) | H₅ of furan | 1 H |
| 8.00 | (s) | Pyrazine proton | 1 H |

IR analysis is as follows:

440, 725, 880, 940, 960, 1080, 1130, 1170, 1230, 1240, 1310, 1330, 1370, 1380, 1435, 1510, 1550, 2920 cm$^{-1}$.

Mass Spectral analysis is as follows:

| m/e | Relative Intensity |
|---|---|
| 39 | 47[3] |
| 42 | 43[5] |
| 43 | 21 |
| 80 | 22 |
| 81 | 47[4] |
| 107 | 20 |
| 191 | 27 |
| 192 | 34[6] |
| 203 | 56[2] |
| M220 | 100[1] |

EXAMPLE VI (3,6-dimethyl-2-pyrazinyl)(2-methyl-3-furyl) sulfide prepared according to the process of Example V is added to a 2% aqueous solution of Wyler's "Beef Flavored Instant Bouillon" (manufactured by Wyler Foods, Division of Borden, Inc., Chicago, Ill., U.S.A.). (Ingredients: salt, hydrolyzed vegetable protein, malto dextrin, sugar, beef fat, water, monosodium glutamate, flavorings, corn sugar, beef extract, caramel color, hydrogenated vegetable fat and U.S. certified food color) at the rate of 1 ppm. The resulting flavor is substantially improved having a sweet, bloody, metallic, meat-like note. Over-all, the resulting beef broth has better meaty characteristics.

EXAMPLE VII

Preparation of (3-Isobutyl-2-Pyrazinyl)(2-Methyl-3-Furyl)Sulfide Reaction

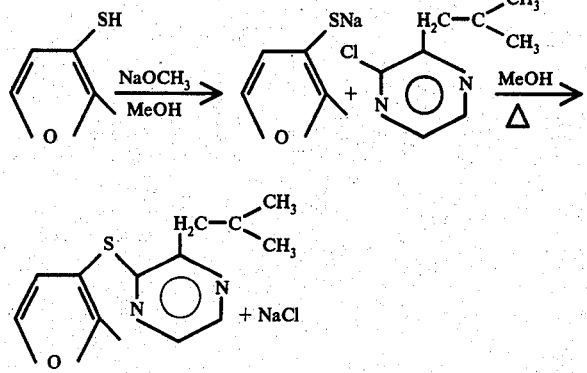

Into a 25 ml round bottom 3 neck flask equipped with magnetic stirrer, Y tube, nitrogen inlet, and reflux condenser with calcium chloride drying tube is placed a solution of 0.15 g (0.0028 moles) of sodium methoxide in 2 ml absolute methyl alcohol. To the sodium methoxide solution, while maintaining the temperature at 22° – 25° C, is added 0.32 g (0.0028 moles) of 2-methyl-3-furan thiol dissolved in 2 ml absolute methanol. The reaction mass is stirred for a period of 10 minutes at 22° – 25° C at which time a solution of 0.43 g (0.0025 moles) of 2-chloro-3-isobutyl-pyrazine in 2 ml absolute methanol is added dropwise over a period of 2 minutes. The reaction mass is then heated to reflux at 65° C under nitrogen and maintained at reflux for a period of 4 hours. At the end of the 4 hour reflux period, the reaction mass is cooled to room temperature. 10 ml of water is added to the reaction mass which is then neutralized to a pH of 5 with dilute hydrochloric acid. Two 7 ml portions of n-hexane are then used to extract the reaction mass. The hexane layers are separated, combined, washed with saturated sodium chloride solution, dried over anhydrous sodium sulfate, and concentrated to a red amber oil weighing 0.51 g. The major material is isolated using GLC techniques (conditions: 8 feet × ¼inche SE-30 column) and is confirmed by NMR, IR and Mass Spectral Analysis to be a material having the structure:

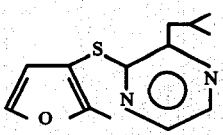

This material has a sweet, beef broth-like, yeasty aroma with hydrolyzed vegetable protein-like "vitamin B complex-like" nuances and a sweet, nutty and meaty flavor with hydrolyzed vegetable protein-like and "vitamin B complex-like" nuances.

NMR analysis is as follows:

| SIGNAL | | INTERPRETATION | |
|---|---|---|---|
| 1.04 ppm | (d) | $-C\begin{smallmatrix}CH_3\\CH_3\end{smallmatrix}$ | .6 H |
| 2.34 | (s) | CH$_3$ of furan | ⎫ |
| 2.34 | (m) | Isopropyl methine proton | ⎬ 4 H |
| 2.78 | (d) | Ar—CH$_2$—C— | 2 H |
| 6.40 | (d) | H$_4$ of furan | 1 H |
| 7.40 | (d) | H$_5$ of furan | 1 H |
| 8.15 | (m) | Pyrazine protons | 2 H |

IR analysis is as follows:
730, 1045, 1085, 1130, 1225, 1370, 1515, 2870, 2920, 2960 cm$^{-1}$.

Mass Spectral analysis is as follows:

| m/e | Relative Intensity |
|---|---|
| 27 | 13 |
| 41 | 22[4] |
| 43 | 23[3] |
| 81 | 18 |
| 205 | 15 |
| 206 | 19[5] |
| 231 | 27[2] |
| 247 | 18[6] |

-continued

| m/e | Relative Intensity |
|---|---|
| M248 | 100[1] |
| 249 | 17 |

EXAMPLE VIII (3-isobutyl-2-pyrazinyl) (2-methyl-3-furyl) sulfide prepared according to the process of Example VII is added to a 2% solution of Wyler's "Beef Flavored Instant Bouillon" (manufactured by Wyler Foods, Division of Borden, Inc., Chicago, Ill., U.S.A.).

(Ingredients: salt, hydrolyzed vegetable protein, malto dextrin, sugar, beef fat, water, monosodium glutamate, flavorings, corn sugar, beef extract, caramel color, hydrogenated vegetable fat and U.S. certified food color)

at the rate of 1 ppm. The resulting beef broth flavor has a yeasty aroma with hydrolyzed vegetable protein-like, "Vitamin B complex-like" nuances. It also has a fully and richer aroma.

EXAMPLE IX (Allyl) (2-Methyl-3Furyl) Sulfide

Reaction

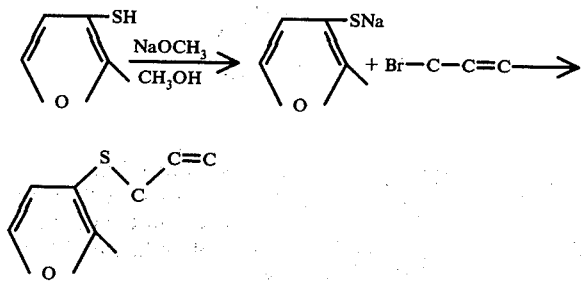

Into a 25 ml 3 neck round bottom flask equipped with magnetic stirrer, Y tube, nitrogen inlet tube, water bath, pot thermometer and reflux condenser is placed a solution of 0.30 g (0.0055 moles) of sodium methoxide in 3 ml of absolute methanol. The reaction mass is cooled to room temperature using the water bath and a solution of 0.57 g (0.005 moles) of 2-methyl-3-furan thiol in 3 ml absolute methanol is added to the sodium methoxide solution. The resulting amber colored solution is stirred at 25° – 30° C for a period of 10 minutes. At the end of this period a solution of 0.66 g (0.0055 moles) of 3-bromo-propene-1 in 1 ml absolute methanol is added to the reaction mass with stirring under nitrogen. The reaction being exothermic, the reaction mass heats up to 37° C. While maintaining the reaction mass at a temperature between 25° and 37° C, the reaction mass is stirred for a period of 30 minutes.

15 ml of water is added to the reaction mass which has a pH of 9 – 10. The reaction mass is neutralized to a pH of 5 – 6 using 10 drops of 10% hydrochloric acid solution and then extracted with 10 ml hexane. The hexane layer is separated, washed with saturated sodium chloride solution, dried over anhydrous sodium sulfate, gravity filtered, and concentrated using a rotary evaporator fitted to a water aspirator. The weight of the concentrated material is 0.52 g. The major product is isolated by GLC trapping and IR, NMR and Mass Spectral analyses confirm that the resulting material has the structure:

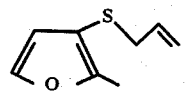

This material has an onion and garlic aroma with a fishy, metallic and chive-like flavor and green, onion, burning nuances.

NMR analysis is as follows:

| SIGNAL | | INTERPRETATION | |
|---|---|---|---|
| 2.36 ppm | (s) | $CH_3-\overset{\overset{O}{\|\|}}{C}-O-$ | 3 H |
| 3.24 | (d) | $=C-CH_2-S-$ | 2 H |
| 5.3–4.86 | (m) | $HC=C\underline{H}_2$ | 2 H |
| 6.06–5.64 | (m) | $\underline{H}C=CH_2$ | ABX pattern 1 H |
| 6.34 | (d) | $H_4$ of furan | 1 H |
| 7.26 | (d) | $H_5$ of furan | 1 H |

IR analysis is as follows:
720, 880, 910, 930, 980, 1080, 1120, 1185, 1220, 1380, 1390, 1420, 1505, 2910 cm$^{-1}$.

Mass Spectral analysis is as follows:

| m/e | Relative Intensity |
|---|---|
| 39 | 42[6] |
| 41 | 54[3] |
| 43 | 52[5] |
| 45 | 53[4] |
| 51 | 27 |
| 85 | 28 |
| 113 | 100[1] |
| 121 | 22 |
| 125 | 24 |
| M154 | 68[2] |

EXAMPLE X

The (Allyl) (2-methyl-3-furyl) sulfide prepared according to the process of Example IX is dissolved in propylene glycol in amount sufficient to give a propylene glycol solution containing 0.1 percent by weight of said sulfide. 0.9 cc of this solution is added to 7.3 gm of a soup base consisting of:

| Ingredient | Quantity (Parts/100 total) |
|---|---|
| Fine ground sodium chloride | 35.62 |
| Hydrolyzed vegetable protein [4 BE: Nestle's] | 27.40 |
| Monosodium glutamate | 17.81 |
| Sucrose | 10.96 |
| Beef Fat | 5.48 |
| Sethness caramel color [powder B & C] | 2.73 |

The resulting mixture is added to 12 ozs. of boiling water to create a soup having an excellent onion flavor. The resulting flavor has an onion and garlic aroma with a fishy and chive-like taste and green, onion, burning nuances.

EXAMPLE XI

Preparation of (2-Methyl-2-Propenyl) (2-Methyl-3-Furyl) Sulfide

Reaction

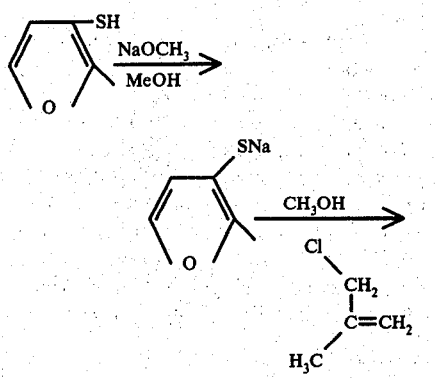

Into a 25 ml 3 neck round bottom flask fitted with magnetic stirrer, pot thermometer, Y tube, nitrogen inlet, reflux condenser and water bath is placed a solution containing 0.27 g of sodium methoxide (0.005 moles) in 3 ml absolute methanol. The sodium methoxide solution is cooled to 22° C and a solution containing 0.57 g (0.005 moles) of 2-methyl-3-furan thiol in 3 ml absolute methanol is added thereto. The reaction mass is then stirred for a period of 10 minutes while maintaining the temperature between 22° and 27° C. A solution containing 0.453 g (0.005 moles) of methallyl chloride (3-chloro-2-methyl-propene) in 1 ml absolute methanol is then added dropwise over a 2 minute period under nitrogen. Since the reaction is exothermic, the reaction mass warms up to 31° C. The reaction mass is allowed to cool to 25° C and remains at that temperature with stirring for a period of 1 hour.

At the end of the 1 hour period, 15 ml of water is added with stirring under a nitrogen blanket. At this point the pH of the solution is between 9 and 10. The reaction is then neutralized with 15 drops of 10% hydrochloric acid to a pH of 6. The reaction mass is extracted with two 10 ml portions of n-hexane. The hexane extracts are combined and washed with one 5 ml portion of saturated sodium chloride solution. The hexane extract is dried over anhydrous sodium sulfate, gravity filtered and concentrated to an amber oil weighing 0.58 g. GLC trapping (conditions: 8 feet × ¼ inch SE-30 column) gives rise to a major peak, confirmed by Mass Spectral, NMR and IR analyses to have the structure:

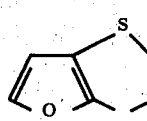

This material has a meaty, beef broth aroma and a meaty, sweet meat, beef broth flavor with pot roast and nutty nuances.

NMR analysis is as follows:

| SIGNAL | | INTERPRETATION | |
|---|---|---|---|
| 1.86 ppm | (s) | $=C-CH_3$ | 3 H |
| 2.33 | (s) | furan-CH$_3$ | 3 H |
| 3.20 | (s) | $=C-CH_2-S-$ | 2 H |
| 4.66 | (d) | $-C=CH_2$ | 2 H |
| 6.32 | (d) | $H_4$ of furan | 1 H |
| 7.24 | (d) | $H_5$ of furan | 1 H |

IR analysis is as follows:
640, 725, 880, 930, 1085, 1120, 1190, 1220, 1365, 1380, 1435, 1445, 1510, 1580, 1640, 2910, 2960 cm$^{-1}$.

Mass Spectral Analysis is as follows:

| m/e | Relative Intensity |
|---|---|
| 27 | 44[6] |
| 29 | 46[5] |
| 39 | 33 |
| 43 | 60[4] |
| 45 | 34 |
| 51 | 25 |
| 55 | 90[2] |
| 113 | 66[3] |
| 153 | 26 |
| M168 | 100[1] |

EXAMPLE XII (2-methyl-2-propenyl) (2-methyl-3-furyl) sulfide prepared according to the process of Example XI is added to a 2% aqueous solution of Wyler's "Beef Flavored Instant Bouillon" (manufactured by Wyler Foods, Division of Borden, Inc., Chicago, Ill., U.S.A.).

(Ingredients: salt, hydrolyzed vegetable protein, malto dextrin, sugar, beef fat, water, monosodium glutamate, flavorings, corn sugar, beef extract, caramel color, hydrogenated vegetable fat and U.S. certified food color)

at the rate of 1 ppm. The resulting beef broth flavor is substantially improved having a sweet, bloody, meatlike note with pot roast and nutty nuances.

EXAMPLE XIII

Preparation of (2-Methyl-3-Furyl) (Methylthiomethyl) Sulfide

Reaction

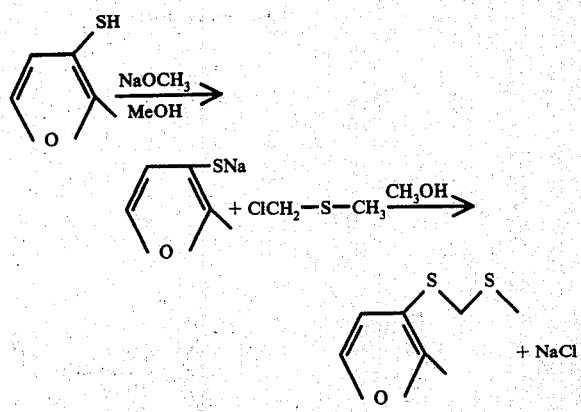

Into a 25 ml round bottom flask equipped with magnetic stirrer, thermometer, water bath, and reflux condenser is added a solution containing 0.27 g of sodium methoxide (0.005 moles) in 3 ml. absolute methanol. While maintaining the solution at 25° – 30° C, 0.57 g (0.005 moles) of 2-methyl-3-furan thiol in 2 ml of absolute methanol is added thereto. At 25° C, 0.483 g (0.005 moles) of chloromethyl methyl sulfide having the formula:

in 2 ml absolute methanol is added to the reaction mass with stirring. The reaction mass warms to 35° C and remains at 25° – 35° C for a period of 3 hours.

At the end of the 3 hour period, the reaction mass is concentrated to an oil with precipitated solid. 10 ml of n-hexane is added to the reaction mass. The hexane solution is separated, washed with 1 ml. saturated sodium chloride solution, and then concentrated to an oil weighing 0.53 g.

The major material of this reaction product is isolated using GLC apparatus (conditions: 8 feet × ¼ inch SE-30 column) yielding a material 99.87% pure having a molecular weight of 174. NMR, IR and Mass Spectral analyses confirm that this material has the structure:

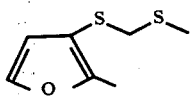

The resulting material has a wheaty/green and sulfury aroma and a sweet, wheaty/green sulfury flavor with cuminic, metallic, scallion and meaty nuances. Its use level, in food flavors, is of the order of 0.0001 parts per million.

NMR analysis is as follows:

| SIGNAL | | INTERPRETATION | |
|---|---|---|---|
| 2.24 ppm | (s) | $CH_3-S-$ | 3 H |
| 2.38 | (s) | $CH_3-C=$ $\mid$ $O-$ | 3 H |
| 3.74 | (s) | $-S-CH_2-S-$ | 2 H |
| 6.40 | (d) | $H_4$ of furan | 1 H |
| 7.30 | (d) | $H_5$ of furan | 1 H |

IR analysis is as follows:
690, 730, 885, 935, 1085, 1125, 1190, 1200, 1220, 1380, 1430, 1510, 2920 cm$^{-1}$.
Mass Spectral analysis is as follows:

| m/e | Relative Intensity |
|---|---|
| 27 | 8[6] |
| 35 | 6 |
| 43 | 12[4] |
| 45 | 17[3] |
| 51 | 8[5] |
| 59 | 5 |
| 61 | 100[f] |
| 113 | 6 |
| 127 | 7 |
| M174 | 38[2] |

EXAMPLE XIV 0.5 grams of (2-methyl-3-furyl)(methylthiomethyl) sulfide prepared according to Example XIII is emulsified in a solution containing the following materials:
  100 grams gum arabic
  100 grams water
  0.5 grams of 20 percent solution in ethanol of butylated hydroxy anisole.

The resultant emulsion is spray-dried in a Bowen Lab. Model spray-drier, inlet temperature 500° F, outlet temperature 200° F. 12 grams of this spray-dried material is mixed with 29.2 grams of the soup base set forth in Example X. The resulting mixture is then added to 12 ozs. of boiling water, and an excellent onion flavored soup is obtained. The resulting mixture has a wheaty/green and sulfury aroma and a sweet, wheaty/green sulfury flavor with cuminic, scallion and meaty nuances.

EXAMPLE XV

330 Grams of gelatin is dissolved at 40° C in 8,250 grams of deionized water to form a "gelatin solution." 600 cc of 5% acetic acid is then added.

330 grams of spray-dried gum arabic is dissolved at room temperature in 8,250 grams of deionized water to form a "gum arabic solution."

The gum arabic solution is placed in a 30 liter vessel and 2.5 liters of the gelatin solution is added. The temperature of the mixture is adjusted to 37° to 40° C. Through a tube beneath the surface of the gum arabic solution, 4,000 grams of 0.1 percent (by weight) solution of (2-methyl-3-furyl)(methylthiomethyl) sulfide prepared according to the process of Example XIII in propylene glycol is added over a period of approximately 30 minutes.

The mixture is agitated at 37° to 40° C until an average droplet size of 25 microns is obtained. The remaining gelatin solution (6 liters) is then added. The pH of the solution is then adjusted to 4.5 to 4.6 with a 10 percent sodium hydroxide solution.

After the 25 micron droplet size is achieved, the temperature is allowed to drop to 25° C over a period of approximately 25 hours while maintaining the pH at 4.5 to 4.6.

The capsule slurry is then stirred and cooled to 5° C and is maintained at 5° C with stirring, for at least 2.5 hours. The slurry is then spray-dried.

The capsules thus formed are filtered and mixed with the soup base of Example X in the weight ratio of 1:6. 20 Grams of the resulting capsule soup base mixture is then added to 30 ozs. of boiling water thereby creating a soup having an excellent onion flavor. The resulting mixture has a wheaty/green and sulfury aroma and a sweet, wheaty/green sulfury flavor with cuminic, scallion and meaty nuances.

EXAMPLE XVI

Preparation of (Benzyl) (2-Methyl-3-Furyl) Sulfide

Reaction

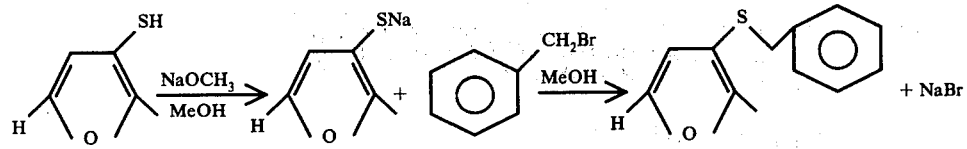

Into a 25 ml round bottom flask equipped with magnetic stirrer, thermometer, reflux condenser and heating mantle is placed a solution containing 0.27 g (0.005 moles) of sodium methoxide in 3 ml of absolute methanol. With stirring and while maintaining the temperature at 25° – 30° C, 0.57 g (0.005 moles) of 2-methyl-3-furan thiol in 3 ml absolute methanol is added. The reaction mass is stirred for a period of 10 minutes. 0.86 g of benzyl bromide dissolved in 2 ml absolute methanol is then added to the reaction mass with stirring at 25° C. The reaction mass is heated to reflux (50° – 60° C) and maintained at this temperature with stirring for a period of 4 hours. The reaction mass is then allowed to cool down to room temperature and is admixed with 10 ml of water with stirring. The reaction mass is neutralized to a pH of 5 – 6 with one drop of 10% hydrochloric acid and 5 ml hexane is added with stirring. The mass is then transferred to a separatory funnel and the organic and aqueous phases are separated. The aqueous phase is diluted with 5 ml water and extracted with 7 ml of n-hexane. The hexane extracts are combined, washed with 5 ml saturated sodium chloride, dried over anhydrous sodium sulfate, and gravity filtered. The resulting solution is then concentrated to an amber oil using rotary evaporation under a water aspirator vacuum. NMR, IR and Mass Spectral analyses confirm that the major product isolated by GLC trapping has the structure:

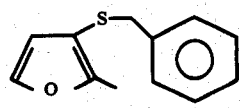

This material is isolated by means of GLC apparatus (conditions: 8 feet × ¼ inch SE-30 column).

The product of the foregoing process has a sweet, pot roast, meaty aroma with a roasted nuance and a sweet, pot roast meaty flavor with brazil nut-like and roasted nuances.

NMR analysis is as follows:

| SIGNAL | | INTERPRETATION | |
|---|---|---|---|
| 1.96 ppm | (s) | C₂ methyl of furan | 3 H |
| 3.74 (s) | | S—CH₂—Ar | 2 H |
| 6.21 (s) | | H₄ of furan | 1 H |
| 7.22–7.03 | (m) | H₅ of furan + aryl protons | 6 H |

IR analysis is as follows:
530, 645, 695, 730, 760, 885, 935, 1085, 1125, 1180, 1220, 1380, 1450, 1490, 1510, 2920, 3020 cm⁻¹.

Mass Spectral analysis is as follows:

| m/e | Relative Intensity |
|---|---|
| 39 | 6[6] |
| 43 | 7[5] |
| 45 | 5 |
| 65 | 13[3] |
| 91 | 100[1] |
| 92 | 8[4] |
| 113 | 5 |
| M204 | 28[2] |
| 205 | 4 |

EXAMPLE XVII (Benzyl)(2-methyl-3-furyl) sulfide prepared according to the process of Example XVI is added to a 2% solution of Wyler's "Beef Flavored Instant Bouillon" (manufactured by Wyler Foods, Division of Borden, Inc., Chicago, Ill., U.S.A.).

(Ingredients: salt, hydrolyzed vegetable protein, malto dextrin, sugar, beef fat, water, monosodium glutamate, flavorings, corn sugar, beef extract, caramel color, hydrogenated vegetable fat, U.S. certified food color)

at the rate of 2 ppm. The resulting beef broth flavor has a pot roast, meaty aroma with a roasted nuance and a sweet, pot roast meaty flavor with brazil nut-like and roasted nuances.

EXAMPLE XVIII

Preparation of (2-Butenyl)(2-Methyl-3-Furyl)Sulfide

Reaction

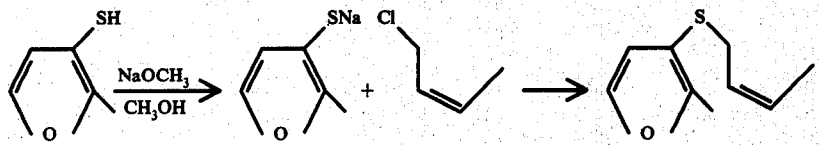

Into a 50 ml round bottom 1 neck flask equipped with nitrogen inlet tube, Y tube, reflux condenser, magnetic stirrer, and cold water bath is placed a solution containing 0.54 g of sodium methylate (0.01 moles) in 6 ml of anhydrous methanol. 1.14 g (0.01 moles) of 2-methyl-3-furan thiol in 6 ml of anhydrous methanol is then added to the sodium methylate solution. The reaction mass is stirred for a period of 10 minutes, with cooling, maintaining the temperature thereof between 24° and 30° C. 0.91 g (0.01 moles) of a mixture of 80% 1-chloro-2-butene and 20% 3-chloro-1-butene dissolved in 2 ml of anhydrous methanol is then added over a 4 minute period warming to 33° C.

The reaction mass is allowed to cool to 23° C and remains at that temperature, with stirring, for a period of 2.5 hours, at which time it is concentrated to 7 ml on a rotary evaporator using water aspirator vacuum. 20 ml water is then added and the reaction mass is neutralized to a pH of 5 – 6 using 4% hydrochloric acid. The reaction mass is extracted with three 10 ml portions of n-hexane. The hexane extracts are combined, washed with 2 ml saturated sodium chloride solution, dried with anhydrous sodium sulfate and concentrated using a rotary evaporator to yield 1.24 g of a yellow oil.

The major product was isolated by GLC trapping (SE-30, 8 foot × ¼ inch column). NMR, IR and Mass Spectral analyses confirm that the resulting material is a compound having the structure:

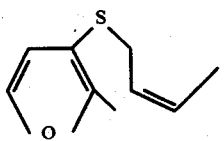

This material has a rubbery, sulfury green aroma and a metallic, bloody meaty flavor, with sulfury, green and burnt nuances.
NMR analysis is as follows:

| SIGNAL | | INTERPRETATION | |
|---|---|---|---|
| 1.63 ppm | (d) | =C—CH$_3$ | 3 H |
| 2.31 | (s) | (furan-CH$_3$) | 3 H |
| 3.17 | (d) | =C—CH$_2$—S— | 2 H |
| 5.38 | (m) | Olefinic protons | 2 H |
| 6.31 | (d) | H (furan) | 1 H |
| 7.25 | (d) | H (furan) | |

IR analysis is as follows:
645, 725, 885, 920, 930, 960, 1085, 1120 1190, 1220, 1370, 1380, 1410, 1430, 1445, 1510, 1580, 2850, 2910, 2930, 2960, 3020 cm$^{-1}$.
Mass Spectral analysis is as follows:

| m/e | Relative Intensity |
|---|---|
| 27 | 17[6] |
| 29 | 20[5] |
| 43 | 25[4] |
| 45 | 14 |
| 51 | 13 |
| 55 | 100[1] |
| 86 | 14 |
| 113 | 17 |
| 114 | 54[2] |
| M168 | 50[3] |

EXAMPLE XIX

The (2-butenyl)(2-methyl-3-furyl) sulfide as prepared in Example XVIII is dissolved in propylene glycol to provide a 0.1% solution. This solution in the amount of 0.9 is added to 7.3 g of a soup base consisting of:

| Ingredient | Parts by Weight |
|---|---|
| Fine ground sodium chloride | 35.5 |
| Hydrolyzed vegetable protein | 27.5 |
| Monosodium glutamate | 18.0 |
| Sucrose | 11.0 |
| Beef fat | 5.5 |
| Sethness caramel color (powder B & C) | 2.7 |

The resulting mixture has a pleasant sulfury green aroma and a bloody meaty flavor, with pleasant sulfury, green and burnt nuances.

What is claimed is:
1. A 3-furyl sulfide having the structure:

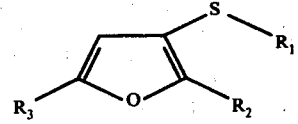

wherein R$_1$ is selected from the group consisting of 3,6-dimethyl-2-pyrazinyl and 3-isobutyl-2-pyrazinyl; and R$_2$ and R$_3$ are each selected from the group consisting of methyl and hydrogen, at least one of R$_2$ and R$_3$ being methyl.

2. The compound of claim 1 wherein R$_2$ is methyl, R$_3$ is hydrogen and R$_1$ is 3,6-dimethyl-2-pyrazinyl.

3. The compound of claim 1 wherein R$_2$ is methyl, R$_3$ is hydrogen and R$_1$ is 3-isobutyl-2-pyrazinyl.

4. The process for augmenting the meaty flavor of a foodstuff comprising the step of adding to said foodstuff from about 0.0001 parts per million up to about 250 parts per million of the compound of claim 1.

5. The process for augmenting the meaty flavor of a foodstuff comprising the step of adding to said foodstuff from about 0.0001 parts per million up to about 250 parts per million of the compound of claim 2.

6. The process for augmenting the meaty flavor of a foodstuff comprising the step of adding to said foodstuff from about 0.0001 parts per million up to about 250 parts per million of the compound of claim 3.

7. A foodstuff flavor composition capable of augmenting the meaty flavor of a foodstuff containing (i) from about 10 ppm up to about 20% by weight of the compound of claim 1, and (ii) at least one flavor adjuvant selected from the group consisting of:

Methyl thiazole alcohol (4-methyl-5-beta-hydroxyethy thiazole);
2-Methyl butanethiol;
4-Mercapto-2-butanone;
3-Mercapto-2-pentanone;
1-Mercapto-2-propanone;
Benzaldehyde;
Furfural;
Furfuryl alcohol;
2-Mercapto propionic acid;
2-Methylfuran-3-thiol;
2-Methyldihydrofuran-3-thiol;

2-Methyltetrahydrofuran-3-thiol;
2-Ethylfuran-3-thiol;
2-Ethyldihydrofuran-3-thiol;
2-Ethyltetrahydrofuran-3-thiol;
2-Propylfuran-3-thiol;
2-Isopropylfuran-3-thiol;
2-Isopropyldihydrofuran-3-thiol;
2-Isopropyltetrahydrofuran-3-thiol;
2-Propyldihydofuran-3-thiol;
2,5-Dimethylfuran-3-thiol;
2,5-Dimethyldihydrofuran-3-thiol;
2,5-Dimethyltetrahydrofuran-3-thiol;
2,5-Diethylfuran-3-thiol;
2,5-Diethyltetrahydrofuran-3-thiol;
2-Ethyl-5-methylfuran-3-thiol;
2-Methyl-5-ethylfuran-3-thiol;
2-Ethyl-5-methyldihydrofuran-3-thiol;
2-Ethyl-5-methyltetrahydrofuran-3-thiol;
2,5-Dipropylfuran-3-thiol;
2,5-Diisopropylfuran-3-thiol;
5-Isopropyl-2-methylfuran-3-thiol;
2-Butylfuran-3-thiol;
2-Ethyl-5-propyltetrahydrofuran-3-thiol;
Bis(2-methyl-3-furyl) sulfide;
Bis(2-methyl-3-furyl) disulfide;
Bis(2-ethyl-3-furyl) sulfide;
Bis(2-ethyl-3-furyl) disulfide;
Bis(2,5-dimethyl-3-furyl) sulfide;
Bis(2,5-dimethyl-3-furyl) disulfide;
Bis(2-methyl-3-dihydrofuryl) sulfide;
Bis(2-methyl-3-tetrahydrofuryl) sulfide;
Bis(2-methyl-3-tetrahydrofuryl) disulfide;
Bis(2-methyl-3-dihydrofuryl) disulfide;
Bis(2,5-diethyl-3-dihydrofuryl) sulfide;
Bis(2,5-diethyl-3-furyl) sulfide;
Bis(2-ethyl-5-methyl-3-furyl) disulfide;
Bis(2,5-diethyl-3-furyl) disulfide;
Bis(2,5-dipropyl-3-furyl)disulfide
Bis(2,5-dipropyl-3-furyl) sulfide;
Bis(2,5-dibutyl-3-furyl) disulfide;
Bis(5-ethyl-2-methyl-3-dihydrofuryl) disulfide;
Bis(2-isopropyl-3-furyl) sulfide;
Bis(2-isopropyl-3-furyl) disulfide;
Bis(2-isopropyl-3-dihydrofuryl) sulfide;
Bis(2-isopropyl-3-tetrahydrofuryl) disulfide;
Alkyl pyrazine;
Methyl pyrazine;
2-Ethyl-3-methyl pyrazine;
Tetramethyl pyrazine;
Dipropyl disulfide;
Methyl benzyl disulfide;
Alkyl thiophenes;
2-Butyl thiophene;
2,3-Dimethyl thiophene;
5-Methyl furfural;
Acetyl furan
2,4-Decadienal;
Guiacol;
Phenyl acetaldehyde;
δ-Decalactone;
d-Limonene;
Acetoin;
Amyl acetate;
Maltol;
Ethyl butyrate;
Levulinic acid;
Piperonal;
Ethyl acetate;

n-Octanol;
n-Pentanal;
Hexanal;
Diacetyl;
Monosodium glutamate;
Sulfur-containing amino acids;
Propyl propenyl disulfide;
Methyl propenyl disulfide;
Methyl propyl disulfide;
Propyl propenyl trisulfide;
Allyl propyl disulfide;
Allyl methyl disulfide;
Propyl propane thiosulfonate;
Hexyl propane thiosulfonate;
Hexyl propane thiosulfinate;
Hexyl thiopropionate;
n-butyl thiopropionate;
n-pentyl thiopropionate;
n-pentyl thiobutyrate;
n-hexyl thiosovalerate; and
n-methyl thio-n-heptanoate.

8. A foodstuff flavor composition capable of augmenting the meaty flavor of a foodstuff containing (i) from about 10 ppm up to about 20% by weight of the compound of claim 2, and (ii) at least one flavor adjuvant selected from the group consisting of:

Methyl thiazole alcohol (4-methyl-5-beta-hydroxyethyl thiazole);
2-Methyl butanethiol;
4-Mercapto-2-butanone;
3-Mercapto-2-pentanone;
1-Mercapto-2-propanone;
Benzaldehyde;
Furfural;
Furfuryl alcohol;
2-Mercapto propionic acid;
2-Methylfuran-3-thiol;
2-Methyldihydrofuran-3-thiol;
2-Methyltetrahydrofuran-3-thiol;
2-Ethylfuran-3-thiol;
2-Ethyldihydrofuran-3-thiol;
2-Ethyltetrahydrofuran-3-thiol;
2-Propylfuran-3-thiol;
2-Isopropylfuran-3-thiol;
2-Isopropyldihydrofuran-3-thiol;
2-Isopropyltetrahydrofuran-3-thiol;
2-propyldihydrofuran-3-thiol;
2,5-Dimethylfuran-3-thiol;
2,5-Dimethyldihydrofuran-3-thiol;
2,5-Dimethyltetrahydrofuran-3-thiol;
2,5-Diethylfuran-3-thiol;
2,5-Diethyltetrahydrofuran-3-thiol;
2-Ethyl-5-methylfuran-3-thiol;
2-Methyl-5-ethylfuran-3-thiol;
2-Ethyl-5-methyldihydrofuran-3-thiol;
2-Ethyl-5-methyltetrahydrofuran-3-thiol;
2,5-Dipropylfuran-3-thiol;
2,5-Diisopropylfuran-3-thiol;
5-Isopropyl-2-methylfuran-3-thiol;
2-Butylfuran-3-thiol;
2-Ethyl-5-propyltetrahydrofuran-3-thiol;
Bis(2-methyl-3-furyl) sulfide;
Bis(2-methyl-3-furyl) disulfide;
Bis(2-ethyl-3-furyl) sulfide;
Bis(2-ethyl-3-furyl) disulfide;
Bis(2,5-dimethyl-3-furyl) sulfide;
Bis(2,5-dimethyl-3-furyl) disulfide;

Bis(2-methyl-3-dihydrofuryl) sulfide;
Bis(2-methyl-3-tetrahydrofuryl) sulfide;
Bis(2-methyl-3-tetrahydrofuryl) disulfide;
Bis(2-methyl-3-dihydrofuryl) disulfide;
Bis(2,5-diethyl-3-dihydrofuryl) sulfide;
Bis(2,5-diethyl-3-furyl) sulfide;
Bis(2-ethyl-5-methyl-3-furyl) disulfide;
Bis(2,5-diethyl-3-furyl) disulfide;
Bis(2,5-dipropyl-3-furyl) disulfide
Bis(2,5-dipropyl-3-furyl) sulfide;
Bis(2,5-dibutyl-3-furyl) disulfide;
Bis(5-ethyl-2-methyl-3-dihydrofuryl) disulfide;
Bis(2-isopropyl-3-furyl) sulfide;
Bis(2-isopropyl-3-furyl) disulfide;
Bis(2-iopropyl-3-dihydrofuryl) sulfide;
Bis(2-isopropyl-3-tetrahydrofuryl) disulfide;
Alkyl pyrazine;
Methyl pyrazine;
2-Ethyl-3-methyl pyrazine;
Tetramethyl pyrazine;
Dipropyl disulfide;
Methyl benzyl disulfide;
Alkyl thiophenes; 2-Butyl thiophene;
2,3-Dimethyl thiophene;
5-Methyl furfural;
Acetyl furan
2,4-Decadienal;
Guiacol;
Phenyl acetaldehyde;
δ-Decalactone;
d-Limonene;
Acetoin;
Amyl acetate;
Maltol;
Ethyl butyrate;
Levulinic acid;
Piperonal;
Ethyl acetate;
n-Octanal;
n-Pentanol;
Hexanal;
Diacetyl;
Monosodium glutamate;
sulfur-containing amino acids;
Propyl propenyl disulfide;
Methyl propenyl disulfide;
Methyl propyl disulfide;
Propyl propenyl trisulfide;
Allyl propyl disulfide;
Allyl methyl disulfide;
Propyl propane thiosulfonate;
Hexyl propane thiosulfonate;
Hexyl propane thiosulfinate;
Hexyl thiopropionate;
n-butyl thiopropionate;
n-pentyl thiopropionate;
n-pentyl thiobutyrate;
n-hexyl thioisovalerate; and
n-methyl thio-n-heptanoate.

9. A foodstuff flavor compositon capable of augmenting the meaty flavor of a foodstuff containing (i) from about 10 ppm up to about 20% by weight of the compound of claim 3, and (ii) at least one flavor adjuvant selected from the group consisting of:

Methyl thiazole alcohol (4-methyl-5-beta-hydroxyethyl thiazole);
2-Methyl butanethiol;
4-Mercapto-2-butanone;
3-Mercapto-2-pentanone;
1-Mercapto-2-propanone;
Benzaldehyde;
Furfural;
Furfuryl alcohol;
2-Mercapto propionic acid;
2-Methylfuran-3-thiol;
2-Methyldihydrofuran-3-thiol;
2-Methyltetrahydrofuran-3-thiol;
2-Ethylfuran-3-thiol;
2-Ethyldihydrofuran-3-thiol;
2-Ethyltetrahydofuran-3-thiol;
2-Propylfuran-3-thiol;
2-Isopropylfuran-3-thiol;
2-Isopropyldihydrofuran-3-thiol;
2-Isopropyltetrahydrofuran-3-thiol;
2-propyldihydofuran-3-thiol;
2,5-Dimethylfuran-3-thiol;
2,5-Dimethyldihydrofuran-3-thiol;
2,5-Dimethyltetrahydrofuran-3-thiol;
2,5-Diethylfuran-3-thiol;
2,5-Diethyltetrahydrofuran-3-thiol;
2-Ethyl-5-methylfuran-3-thiol;
2-Methyl-5-ethylfuran-3-thiol;
2-Ethyl-5-methyldihydrofuran-3-thiol;
2-Ethyl-5-methyltetrahydrofuran-3-thiol;
2,5-Dipropylfuran-3-thiol;
2,5-Diisopropylfuran-3-thiol;
5-Isopropyl-2-methylfuran-3-thiol;
2-Butylfuran-3-thiol;
2-Ethyl-5-propyltetrahydrofuran-3-thiol;
Bis(2-methyl-3-furyl) sulfide;
Bis(2-methyl-3-furyl) disulfide;
Bis(2-ethyl-3-furyl) sulfide;
Bis(2-ethyl-3-furyl) disulfide;
Bis(2,5-dimethyl-3-furyl) sulfide;
Bis(2,5-dimethyl-3-furyl) disulfide;
Bis(2-methyl-3-dihydrofuryl) sulfide;
Bis(2-methyl-3-tetrahydrofuryl) sulfide;
Bis(2-methyl-3-tetrahydrofuryl) disulfide;
Bis(2-methyl-3-dihydrofuryl) disulfide;
Bis(2,5-diethyl-3-dihydrofuryl) sulfide;
Bis(2,5-diethyl-3-furyl) sulfide;
Bis(2-ethyl-5-methyl-3-furyl) disulfide;
Bis(2,5-diethyl-3-furyl) disulfide;
Bis(2,5-dipropyl-3-furyl)disulfide
Bis(2,5-dipropyl-3-furyl) sulfide;
Bis(2,5-dibutyl-3-furyl) disulfide;
Bis(5-ethyl-2-methyl-3-dihydrofuryl) disulfide;
Bis(2-isopropyl-3-furyl) sulfide;
Bis(2-isopropyl-3-furyl) disulfide;
Bis(2-isopropyl-3-dihydrofuryl) sulfide;
Bis(2-isopropyl-3-tetrahydrofuryl) disulfide;
Alkyl pyrazine;
Methyl pyrazine;
2-Ethyl-3-methyl pyrazine;
Tetramethyl pyrazine;
Dipropyl disulfide;
Methyl benzyl disulfide;
Alkyl thiophenes;
2-Butyl thiophene;
2,3-Dimethyl thiophene;
5-Methyl furfural;
Acetyl furan
2,4-Decadienal;
guiacol;
Phenyl acetaldehyde;

δ-Declactone;
d-Limonene;
Acetoin;
Amyl acetate;
Maltol;
Ethyl butyrate;
Levulinic acid;
Piperonal;
Ethyl acetate;
n-Octanal;
n-Pentanal;
Hexanal;
Diacetyl;
Monosodium glutamate;
Sulfur-containing amino acids;
Propyl propenyl disulfide;
Methyl propenyl disulfide;
Methyl propyl disulfide;
Propyl propenyl trisulfide;
Allyl propyl disulfide;
Allyl methyl disulfide;
Propyl propane thiosulfonate;
Hexyl propane thiosulfonate;
Hexyl propane thiosulfinate;
Hexyl thiopropionate;
n-butyl thiopropionate;
n-pentyl thiopropionate;
n-pentyl thiobutyrate;
n-hexyl thioisovalerate; and
n-methyl thio-n-heptanoate.

* * * * *

UNITED STATES PATENT AND TRADEMARK OFFICE
CERTIFICATE OF CORRECTION

PATENT NO. : 3,988,510
DATED : October 26, 1976
INVENTOR(S) : WILLIAM J. EVERS, HOWARD H. HEINSOHN, JR. MANFRED HUGO VOCK AND CHRISTOPHER GIACINO.

It is certified that error appears in the above-identified patent and that said Letters Patent are hereby corrected as shown below:

Col. 5, line 65 (chart), the word "dimethyl-2-furyl)sulfide" should read "dimethyl-3-furyl)sulfide"

Col. 12, line 25, Title, "Preparation of (2-Methyl-3-Furyl) (2-Pyridylmethyol)Sulfide" should read "Preparation of (2-Methyl-3-Furyl)(2-Pyridylmethyl)Sulfide"

Col. 18, line 22, the word "inche" should read "inch".

Signed and Sealed this

Nineteenth Day of April 1977

[SEAL]

Attest:

RUTH C. MASON
Attesting Officer

C. MARSHALL DANN
Commissioner of Patents and Trademarks